(12) United States Patent
Park et al.

(10) Patent No.: US 11,440,490 B2
(45) Date of Patent: Sep. 13, 2022

(54) LOCATION-BASED CHECKLIST INTERFACE FOR AUTONOMOUS VEHICLE USERS

(71) Applicant: UATC, LLC, San Francisco, CA (US)

(72) Inventors: Min Kyu Park, South Pasadena, CA (US); Christopher Matthew D'Eramo, Bethel Park, PA (US)

(73) Assignee: UATC, LLC, Mountain View, CA (US)

( * ) Notice: Subject to any disclaimer, the term of this patent is extended or adjusted under 35 U.S.C. 154(b) by 746 days.

(21) Appl. No.: 16/174,952

(22) Filed: Oct. 30, 2018

(65) Prior Publication Data

US 2020/0050199 A1 Feb. 13, 2020

Related U.S. Application Data

(60) Provisional application No. 62/716,055, filed on Aug. 8, 2018.

(51) Int. Cl.
  *G05D 1/00* (2006.01)
  *G06F 3/0482* (2013.01)
  (Continued)

(52) U.S. Cl.
  CPC ........ *B60R 13/0823* (2013.01); *B60N 2/0224* (2013.01); *B60N 2/30* (2013.01);
  (Continued)

(58) Field of Classification Search
  CPC .............. B60R 13/0823; G01C 21/343; G01C 21/3697; G01G 19/12; G05D 1/0088;
  (Continued)

(56) References Cited

U.S. PATENT DOCUMENTS

| | | |
|---|---|---|
| 1,758,826 A | 5/1930 | Dellert |
| 1,911,224 A | 5/1933 | Dellert |

(Continued)

FOREIGN PATENT DOCUMENTS

| | | |
|---|---|---|
| CN | 203623483 | 6/2014 |
| CN | 105189313 | 12/2015 |

(Continued)

OTHER PUBLICATIONS

International Search Report and Written Opinion for PCT/US2019/045662, dated Sep. 23, 2019, 12 pages.

*Primary Examiner* — Abby Y Lin
*Assistant Examiner* — Danielle Marie Jackson
(74) *Attorney, Agent, or Firm* — Dority & Manning, P.A.

(57) ABSTRACT

Systems and methods for controlling autonomous vehicles are provided. In one example embodiment, a computing system can obtain data indicative of a service assignment associated with an autonomous vehicle. The service assignment is indicative of a destination location. The computing system can determine a checklist associated with the destination location. The computing system can provide, for display via a display device, data indicative of a user interface. The user interface can present the checklist associated with the destination location. The computing system can obtain data indicative of user input associated with the checklist. The computing system can determine that the checklist has been completed based at least in part on the user input associated with the checklist. The computing system can, in response to determining that the checklist has been completed, cause the autonomous vehicle to initiate a motion control to travel to the destination location.

20 Claims, 9 Drawing Sheets

(51) Int. Cl.
   *G08G 1/01* (2006.01)
   *B60R 13/08* (2006.01)
   *B60N 2/30* (2006.01)
   *B60N 2/02* (2006.01)
   *G01C 21/34* (2006.01)
   *G01G 19/12* (2006.01)
   *G05D 1/02* (2020.01)
   *G06Q 10/06* (2012.01)
   *G06Q 30/02* (2012.01)
   *G06Q 50/28* (2012.01)
   *G06F 16/29* (2019.01)

(52) U.S. Cl.
   CPC .......... *G01C 21/343* (2013.01); *G01G 19/12* (2013.01); *G05D 1/0088* (2013.01); *G05D 1/0212* (2013.01); *G06F 3/0482* (2013.01); *G06Q 10/06315* (2013.01); *G06Q 30/0283* (2013.01); *G06Q 50/28* (2013.01); *G08G 1/0125* (2013.01); *G05D 1/021* (2013.01); *G05D 2201/0212* (2013.01); *G05D 2201/0213* (2013.01); *G06F 16/29* (2019.01)

(58) Field of Classification Search
   CPC ......... G05D 1/0212; G05D 2201/0212; G05D 1/021; G05D 2201/0213; G06Q 10/06315; G06Q 30/0283; G06Q 50/28; G06Q 50/30; G06Q 10/06311; G06Q 10/063114; G06F 3/0482; G06F 16/29; G08G 1/0125; B60N 2/30; B60N 2/0224
   See application file for complete search history.

(56) References Cited

U.S. PATENT DOCUMENTS

| | | |
|---|---|---|
| 2,132,279 A | 10/1938 | Wicknick et al. |
| 2,563,347 A | 8/1951 | Long |
| 2,642,119 A | 6/1953 | Dary |
| 3,463,539 A | 8/1969 | Racine et al. |
| 3,632,161 A | 1/1972 | Arfaras et al. |
| 3,637,253 A | 1/1972 | Maule et al. |
| 5,653,262 A | 8/1997 | Hanemaayer |
| 5,738,408 A | 4/1998 | Wu |
| 6,030,037 A | 2/2000 | Ritch et al. |
| 6,264,261 B1 | 7/2001 | Krafcik |
| 6,338,518 B1 | 1/2002 | D'Annunzio et al. |
| 6,350,972 B1 | 2/2002 | Wright et al. |
| 6,540,279 B1 | 3/2003 | Bargiel |
| 6,925,679 B2 | 8/2005 | Wallach et al. |
| 7,066,519 B2 | 6/2006 | Rhodes et al. |
| 7,090,274 B1 | 8/2006 | Khan et al. |
| 7,156,442 B2 | 1/2007 | McManus et al. |
| 8,010,230 B2 | 8/2011 | Zini et al. |
| 8,182,016 B2 | 5/2012 | Kaip et al. |
| 8,186,735 B2 | 5/2012 | Maceri et al. |
| 9,256,852 B1 | 2/2016 | Myllymaki |
| 9,510,682 B2 | 12/2016 | Hasegawa et al. |
| 9,533,625 B2 | 1/2017 | Krishnan et al. |
| 10,521,752 B1* | 12/2019 | Williamson ... G06Q 10/063112 |
| 2005/0028543 A1 | 2/2005 | Whitehead et al. |
| 2007/0156540 A1 | 7/2007 | Koren et al. |
| 2008/0185893 A1 | 8/2008 | Behrens et al. |
| 2009/0125361 A1* | 5/2009 | Rossi ............ G06Q 10/063118 705/7.17 |
| 2010/0052374 A1 | 3/2010 | Bell et al. |
| 2010/0063721 A1* | 3/2010 | Won ................... G01C 21/3611 715/810 |
| 2010/0271202 A1* | 10/2010 | Lin ........................ B60R 25/00 340/540 |
| 2015/0006005 A1 | 1/2015 | Yu et al. |
| 2015/0379468 A1 | 12/2015 | Danaher |
| 2016/0116293 A1* | 4/2016 | Grover ................. G01C 21/34 701/23 |
| 2016/0280095 A1 | 9/2016 | Frye et al. |
| 2017/0354996 A1 | 2/2017 | Lim et al. |
| 2017/0166173 A1 | 6/2017 | Lauffer et al. |
| 2017/0192428 A1 | 7/2017 | Vogt et al. |
| 2018/0079278 A1 | 3/2018 | Kirpichnikov et al. |
| 2019/0018411 A1* | 1/2019 | Herbach ................ B60R 1/008 |
| 2020/0394746 A1* | 12/2020 | Krishnamurthy .. G06K 9/00791 |
| 2021/0073728 A1* | 3/2021 | Yu ...................... G06Q 10/0833 |

FOREIGN PATENT DOCUMENTS

| | | |
|---|---|---|
| DE | 4200476 | 7/1993 |
| DE | 19822694 | 11/1999 |
| DE | 102010055365 | 7/2011 |
| EP | 1247473 | 10/2002 |
| EP | 2258579 | 8/2010 |
| FR | 2920011 | 2/2009 |
| JP | 6270307 | 12/2013 |
| JP | 6262937 | 1/2014 |
| KR | 100783510 | 6/2007 |
| WO | WO2012060462 | 5/2012 |
| WO | WO2017156586 | 9/2017 |

* cited by examiner

LOCATION-BASED CHECKLIST INTERFACE FOR AUTONOMOUS VEHICLE USERS

PRIORITY CLAIM

The present application is based on and claims priority to U.S. Provisional Application 62/716,055 having a filing date of Aug. 8, 2018, which is incorporated by reference herein.

FIELD

The present disclosure relates generally to generating and presenting a destination location based checklist for a user of an autonomous vehicle to increase the efficiency of autonomous vehicle operation.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by a computing system including one or more computing devices, data indicative of a service assignment associated with an autonomous vehicle. The service assignment is indicative of a destination location for a vehicle service. The method includes determining, by the computing system, a checklist associated with the destination location based at least in part on the data indicative of the service assignment. The checklist includes a plurality of checklist elements. The method includes providing, by the computing system for display via a display device, data indicative of a user interface. The user interface presents the checklist associated with the destination location. The method includes obtaining, by the computing system, data indicative of user input associated with the checklist. The method includes determining, by the computing system, that the checklist has been completed based at least in part on the user input associated with the checklist. The method includes, in response to determining that the checklist has been completed, causing, by the computing system, the autonomous vehicle to initiate a motion control to travel to the destination location.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of a destination location associated with a user of an autonomous vehicle. The operations include determining a checklist for the user based at least in part on the destination location. The checklist includes a plurality of checklist elements. The operations include providing, for display via a display device, data indicative of a user interface. The user interface presents the checklist. The operations include obtaining data indicative of user input associated with the checklist. The operations include determining that the checklist has been completed based at least in part on the user input associated with the checklist. The operations include, in response to determining that the checklist has been completed, causing the autonomous vehicle to initiate a motion control to travel to the destination location.

Yet another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include obtaining data indicative of a service assignment. The service assignment is indicative of a destination location. The operations include determining a checklist associated with the destination location based at least in part on the data indicative of the service assignment. The operations include providing, for display via a user interface on a display device, data indicative of the checklist associated with the destination location. The operations include determining that the checklist has been completed based at least in part on user input associated with the checklist. The operations include, in response to determining that the checklist has been completed, causing the autonomous vehicle to initiate a motion control to travel to the destination location.

Other example aspects of the present disclosure are directed to systems, methods, vehicles, apparatuses, tangible, non-transitory computer-readable media, and memory devices for determining a destination location based checklist, controlling autonomous vehicles, and efficiently using of the computational resources of the autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
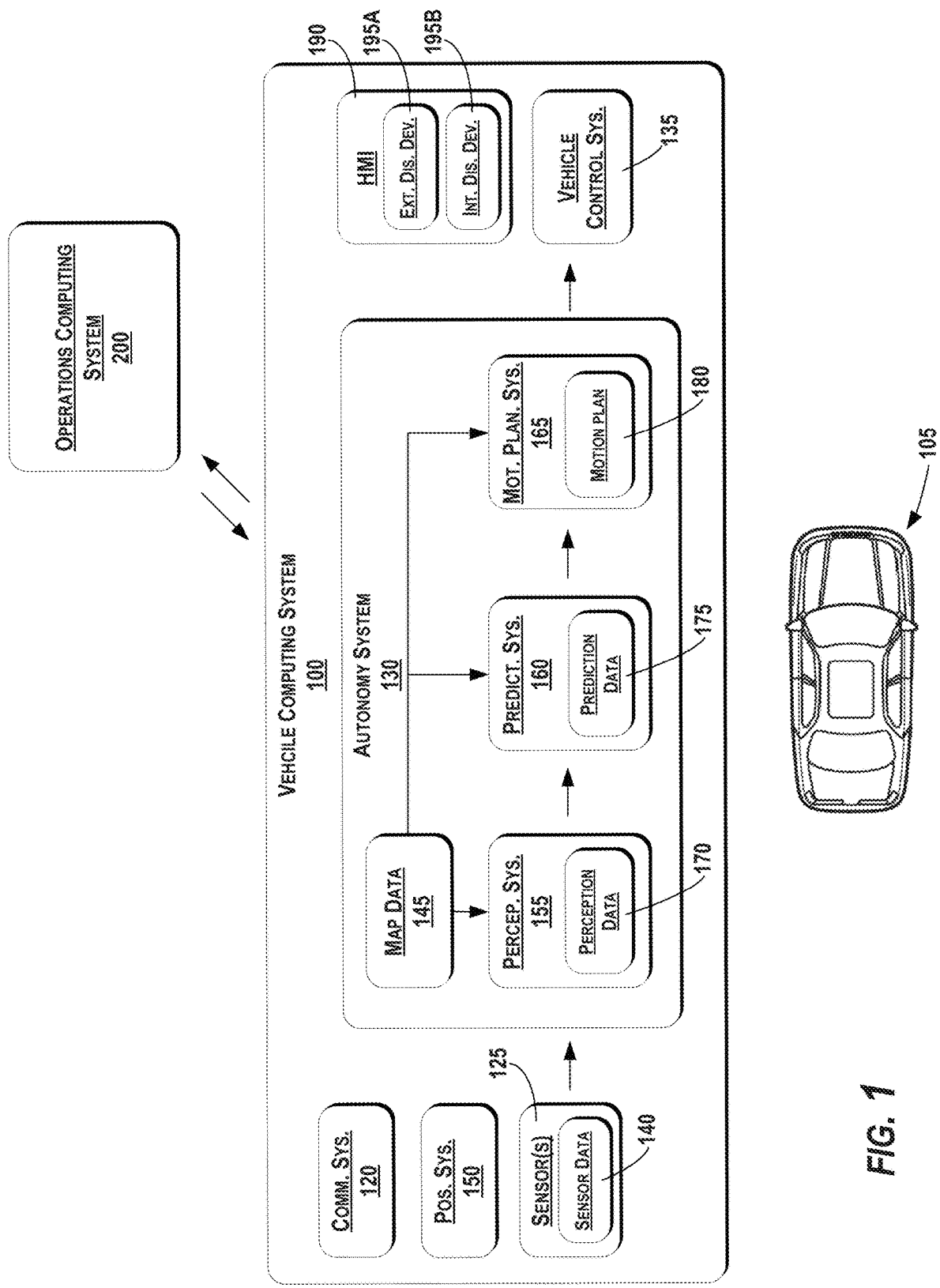
FIG. 1 depicts an example autonomous vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to presenting a user of an autonomous vehicle with a checklist associated with the user's destination location. For instance, an autonomous vehicle can be utilized to perform vehicle services such as, for example, transportation services (e.g., rideshare services). The vehicle service(s) can be offered (e.g., via a mobile software application, website, etc.) to users by a service entity (e.g., a company that offers and/or coordinates the provision of vehicle services to users). In the event that a user requests a vehicle service, a computing system of the associated service entity can send a service assignment to an autonomous vehicle. The service assignment can include a request for the vehicle to perform the vehicle service for the user and a variety of information about the requested vehicle service including, for example, an origin location (e.g., a user's home) and a destination location (e.g., an airport). In the event that the user forgets an item (e.g., a plane ticket, passport, etc.) and/or another task that needs to be completed before arriving at the destination location, the user can request that the vehicle re-route itself to the user's origin location. However, such re-routing can cause the autonomous vehicle to use more of its onboard computing resources (e.g., power resources, processing resources, memory resources, etc.) than originally allocated for the service request. Ultimately, this may lead to faster depletion of a vehicle's resources and, thus, more vehicle downtime as these resources are replenished (e.g., by charging, data downloading, etc. at a service depot).

To help avoid such nonessential resource usage, an autonomous vehicle can generate and present the user with a checklist before the autonomous vehicle begins to travel to the destination location. For instance, the autonomous vehicle can determine a checklist associated with the destination location for the user. The checklist can include a plurality of checklist elements for the user to complete. The checklist elements can list, for example, items (e.g., plane tickets, luggage, identification/passport, etc.) a user should consider before travelling to the requested destination location (e.g., an airport). The autonomous vehicle can provide the checklist to a user via a user interface on a display device (e.g., on the exterior of the vehicle, on an interior tablet, etc.). Once the checklist has been completed, the autonomous vehicle can begin to travel to the destination location. In this way, the technology of the present disclosure can allow the autonomous vehicle to avoid nonessential resource usage on vehicle re-routing, while also providing the user with an improved experience with the autonomous vehicle.

More particularly, an autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) for operating the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with one or more computing systems that are remote from the vehicle, as further described herein.

An autonomous vehicle can perform vehicle services for one or more service entities. A service entity can be associated with the provision of one or more vehicle services. For example, a service entity can be an individual, a group of individuals, a company, a group of companies (e.g., affiliated entities), and/or another type of entity that offers and/or coordinates the performance of one or more vehicle services to one or more users. For example, a service entity can offer vehicle service(s) to users via one or more software applications (e.g., on a user computing device), via a website, and/or via any other types of interfaces that allow a user to request a vehicle service. As described herein, the vehicle services can include transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services. The service entity can utilize an operations computing system to coordinate the provisions of vehicle service(s) associated with the service entity.

A user can provide (e.g., via a user device) a request for a vehicle service to an operations computing system associated with the service entity. The request can indicate the type of vehicle service that the user desires (e.g., a transportation service, a delivery service, a courier service, etc.), one or more locations (e.g., an origin location, a destination location, etc.), timing constraints (e.g., pick-up time, drop-off time, deadlines, etc.), service parameters (e.g., a need for handicap access, a need for trunk space, etc.), and/or other information. The operations computing system of the service entity can process the request and identify one or more autonomous vehicles that may be able to perform the requested vehicle services for the user. The operations computing system can send a service assignment indicative of the requested vehicle services to an autonomous vehicle (e.g., via the service entity's computing platform).

To help avoid inefficient vehicle re-routing during the performance of a vehicle service, the autonomous vehicle can present the user with a checklist associated with the user's requested destination location. To do so, the onboard computing system of the autonomous vehicle can obtain data indicative of a service assignment associated with the autonomous vehicle. As described herein, the service assignment can be indicative of a destination location for a requested vehicle service. For example, the service assignment can indicate that the autonomous vehicle is to transport a user from a home to an airport. The destination location (e.g., the airport) can be represented as a coordinate (e.g., GPS coordinate, etc.), latitude-longitude pair, address, semantic location, and/or other type of identifier.

The computing system can generate the checklist for user to complete before the autonomous vehicle initiates travel to the destination location. For example, the computing system can determine a checklist associated with the destination location based at least in part on the data indicative of the service assignment. The checklist can include a plurality of checklist elements (e.g., checklist items, questions, tasks, reminders, notifications, etc.) associated with the destination location. The checklist elements can list, for example, items, tasks, and/or other information for a user to consider before the autonomous vehicle begins to travel to the destination location. For example, in the event that the destination location is an airport, the checklist can list items for the user to consider before travelling to the airport (e.g., plane tickets, luggage, identification/passport, immigration papers, etc.). Additionally, or alternatively, one or more checklist elements can present a task for the user to consider (e.g., check-in to flight, etc.). The checklist can also present one or more questions associated with the destination location. For example, the checklist may include a question asking the user which airline the user is flying (if such information is not already known by the autonomous vehicle). In some implementations, the vehicle computing system can use the answer to this question to help navigate the autonomous vehicle (e.g., to the appropriate departure terminal).

In some implementations, the vehicle computing system can obtain data indicative of the checklist from a remote computing system. For instance, the vehicle computing system can obtain data indicative of the checklist (and its checklist elements) from an operations computing system. Such data can be included with the service assignment communicated to the autonomous vehicle.

In some implementations, the vehicle computing system can determine the checklist based at least in part on a checklist data structure. For instance, the vehicle computing system can access a checklist data structure via an onboard and/or remote memory. The checklist data structure can include a hierarchy, tree structure, etc. that the vehicle computing system can traverse to determine which checklist/checklist elements should be utilized given the user's destination location. By way of example, the checklist data structure can include a data tree with a plurality of parent nodes. Each parent node can be indicative of a type of destination location. For example, a first parent node can be indicative of an airport, a second parent node can be indicative of a stadium, etc. Each parent node can have child nodes or branches. Each of the child nodes can be indicative of a checklist element such as, for example, an item or question to be included on the checklist for that particular location. For example, a first parent node representing an airport can have a plurality of child nodes, each representing a different item/question for the user to consider before travelling to the airport. For example, the child nodes can be reminders for the user's plane ticket, identification/passport, immigration papers, luggage, etc., tasks reminding the user to check-in to the flight, and/or questions asking for the user's flight information (e.g., airline, flight number, etc.). To utilize the checklist data structure, the vehicle computing system can determine the user's destination location is an airport (e.g., based on a coordinate/lat-long/address in the service assignment, based on a semantic name provided with the service assignment, etc.). The vehicle computing system can access the checklist data structure and traverse it to find the parent node that is indicative of an airport. Once the parent node is located, the vehicle computing system can traverse the child nodes to determine what checklist elements should be included in the checklist for the user going to the airport.

The vehicle computing system can provide, for display via a display device, data indicative of a user interface that presents the checklist. The user interface can be displayed on a variety of devices. In some implementations, the display device can be positioned such that the user interface is viewable by a user from the exterior of the autonomous vehicle and the user can interact with the display device from the vehicle's exterior. For example, one or more windows of the autonomous vehicle can include smart glass technology that can perform as a display device for presenting the user interface. The user can interact with the smart glass window (e.g., via a touch interaction) to address the checklist elements. In some implementations, the user interface can be displayed via a user device that is located within the interior of the autonomous vehicle and that is associated with the autonomous vehicle. For example, the user interface presenting the checklist can be displayed via a tablet that is typically kept within the interior of the autonomous vehicle. In some implementations, the user interface can be displayed via a user device associated with a user. For example, data indicative of the checklist can be provided to a mobile phone of the user and the user interface can be rendered via the display device of the mobile phone. The checklist can be presented on the user's mobile phone (and/or another display device) before, during, and/or after the autonomous vehicle arrives to pick-up the user.

In some implementations, the device displaying the user interface can be chosen based on environmental conditions associated with the autonomous vehicle. For instance, the autonomous vehicle can obtain data indicative of the weather condition(s) surrounding the autonomous vehicle (e.g., by analyzing acquired sensor data to determine the weather condition(s), obtain data from a remote computing system indicative of the weather condition(s), etc.). The vehicle computing system can determine where to display the checklist user interface based at least in part on the weather condition(s). For example, in the event that it is raining, the vehicle computing system can provide the data indicative of the checklist to a user device within the interior of the autonomous vehicle (e.g., an onboard tablet) so that the user device can render a user interface (via its display device) that presents the checklist to the user inside the vehicle. In this way, the user need not stand in the rain to complete the checklist. In another example, the autonomous vehicle can obtain data indicative of the traffic condition(s) surrounding the autonomous vehicle (e.g., by analyzing acquired sensor data to determine a level of traffic, obtaining traffic data from a remote computing system, etc.). The vehicle computing system can determine where to display the checklist user interface based at least in part on the traffic condition(s). For example, in the event that the autonomous vehicle may be pulled-over on a busy street to pick-up the user, the vehicle computing system can provide the data indicative of the checklist to the user device within the interior of the autonomous vehicle (e.g., an onboard tablet). In this way, the user can board the autonomous vehicle in the event that the vehicle determines it should move (e.g., circle the block) to prevent a traffic build-up.

In some implementations, the user interface can present other types of information associated with the user's destination location. For example, in the event that the destination location is a stadium, the user interface can present information related to a team participating in an upcoming event at the stadium, coupons for food to be purchased at the stadium, a stadium seating chart, etc.

The autonomous vehicle can be prohibited from travelling to the destination location until the checklist has been completed. For instance, the autonomous vehicle can remain in a parked position/mode at the origin location until the user addresses each checklist element, as further described herein. In some implementations, the autonomous vehicle can travel within a limited geographic area until the user addresses each checklist element. For example, the autonomous vehicle may pick-up the user on a busy street. The autonomous vehicle may circle a block proximate the user's origin location until the checklist is completed. In this way, the autonomous vehicle can avoid traffic disruptions while the user is completing the checklist but also remain in proximity to the origin location in the event the user decides to retrieve an item (e.g., a forgotten passport, etc.).

The autonomous vehicle can obtain data indicative of user input associated with the checklist and determine that the checklist has been completed based at least in part on such user input. For instance, the user interface can present user interface elements (e.g., checkboxes, toggles, soft buttons, etc.) that allow a user to indicate that the checklist element has been addressed. By way of example, the user can provide a touch interaction to an interactive display screen that checks a checkbox associated with a reminder for the user to bring the user's plane tickets to the airport. One or more of the checklist elements can be optional such that the user can indicate that the checklist element should be ignored. For example, in the event that the user is travelling to a stadium, a checklist element can request that the user indicate the user's seating assignment within the stadium. In the event that the user does not desire to provide such information, the user can provide a touch interaction to the display device to check an "IGNORE" checkbox associated with that checklist element.

The checklist can be continuously displayed via the user interface on the display device until all the checklist elements are addressed. In the event that the user realizes that the user has forgotten an item (e.g., plane tickets), the user can interact with a user interface element indicating as such. The autonomous vehicle can remain parked or return to the origin location (e.g., if circling the block) to allow the user to retrieve such an item. The user interface presenting the checklist can persist until the user returns and addresses the remaining checklist element(s). The vehicle computing system can determine that the checklist has been completed once the vehicle computing system obtains data indicative of user input addressing all the checklist elements (e.g., confirming, ignoring, etc.).

In response to determining that the checklist has been completed, the vehicle computing system can cause the autonomous vehicle to initiate a motion control to travel to the destination location. A motion control can be an operation, action, etc. that is associated with controlling the motion of the vehicle. For instance, the vehicle computing system (e.g., an onboard autonomy system) can determine a motion plan that can be provided to the vehicle control system(s) of the vehicle. The vehicle control system(s) can be associated with a vehicle controller (e.g., including a vehicle interface) that is configured to implement the motion plan. The vehicle controller can, for example, translate the motion plan into instructions for the appropriate vehicle control component (e.g., acceleration control, brake control, steering control, etc.). Once the user has completed the checklist, the vehicle computing system can determine a motion plan that initiates the autonomous vehicle to travel to the destination location. This motion plan can be utilized to navigate to the user's destination location.

In some implementations, information gathered by the user with respect to the checklist can be utilized for planning the motion of the autonomous vehicle. For instance, the vehicle computing system can utilize information acquired via the user input to determine a sub-location associated with the destination location. The sub-location can be a more granular position with respect to the destination location. By way of example, the user's destination location can be an airport and a checklist may include a question asking for the user's flight information (e.g., airline, flight number, etc.). The autonomous vehicle can utilize the flight information (and data indicative of a flight index and airport map) to determine an appropriate drop-off location for the user at the airport (e.g., the most convenient departure terminal for that airline/flight). In another example, the user's destination location can be a stadium and a checklist may include a question asking for the user's seat assignment. The autonomous vehicle can utilize the seat assignment (and data indicative of a stadium map/seating chart) to determine an appropriate drop-off location for the user at the stadium (e.g., the stadium entrance closest to the user's seats). The user can disembark from the autonomous vehicle at the destination location/sub-location. When the autonomous vehicle receives a new service assignment, the vehicle computing system can determine a new checklist for the new service assignment (e.g., based at least in part on the destination location associated therewith).

The systems and methods described herein provide a number of technical effects and benefits. For instance, the systems and methods improve the ability of the autonomous vehicle to more efficiently reach a destination location. More particularly, by decreasing the amount of vehicle re-routing (e.g., due to a forgotten item, etc.), the autonomous vehicle can navigate to a requested destination location in a more timely manner. Shorter trip time can lead to less vehicle downtime as the autonomous vehicle is able to perform more vehicle services before needing to go to a service depot. Moreover, the presentation of a checklist for a user can improve the user experience with an autonomous vehicle, helping to build trust in autonomous vehicle technology.

The systems and methods of the present disclosure can provide an improvement to vehicle computing technology, such as autonomous vehicle computing technology. For instance, the systems and methods provide an improved approach to selecting among a plurality of different service entities and/or service assignments. For example, a computing system (e.g., a vehicle computing system) can obtain data indicative of a service assignment associated with an autonomous vehicle. The service assignment can be indicative of a destination location for a requested vehicle service. The computing system can determine a checklist (e.g., including a plurality of checklist elements) associated with the destination location based at least in part on the data indicative of the service assignment. The computing system can provide for display (e.g., via a display device), data indicative of a user interface that presents the checklist associated with the destination location. The user interface can be viewable by the user so that the user can interact with the checklist. The computing system can obtain data indicative of user input associated with the checklist. The computing system can determine that the checklist has been completed based at least in part on the user input associated with the checklist. In response, the computing system can cause the autonomous vehicle to initiate a motion control to travel to the destination location. In this way, the technology of the present disclosure provides an approach to prevent the nonessential use of the onboard computing resources of the autonomous vehicle. In particular, by leveraging the data from a service assignment (e.g., a destination location) to determine a checklist and presenting the checklist for the user, the systems and methods described herein can reduce the chance that an autonomous vehicle will be re-routed. In this way, the autonomous vehicle can better preserve its computing (e.g., processing, memory, etc.) and power resources. Ultimately, this can lead to less vehicle downtime (e.g., while the vehicle is replenishing its resources at a service depot).

With reference now to the FIGS., example embodiments of the present disclosure will be discussed in further detail. FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for determining a checklist based at least in part on a destination location, providing data indicative of the checklist for display (e.g., via a display device), obtaining data indicative of user input associated with the checklist, controlling an autonomous vehicle, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). For example, the communications system 120 can allow the autonomous vehicle to send and receive data from an operations computing system 200 of a service entity. In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The autonomous vehicle 105 can also include other sensors configured to acquire data associated with the autonomous vehicle 105. For example, the autonomous vehicle 105 can include inertial measurement unit(s), and/or other sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can include an HMI ("Human Machine Interface") 190 that can output data for and accept input from a user of the autonomous vehicle 105. The HMI 190 can include one or more output devices such as display devices, speakers, tactile devices, etc. For instance, the autonomous vehicle 105 can include a plurality of display devices 195A-B. The display devices 195A-B can include smart glass technology, a display screen, CRT, LCD, plasma screen, touch screen, TV, projector, other types of display devices and/or a combination thereof. One or more of the display devices 195A-B can be included in a user device (e.g., personal computer, tablet, mobile phone, etc.).

The plurality of display devices 195A-B can include a first display device 195A and a second display device 195B. The first display device 195A can be associated with the exterior of the autonomous vehicle 105. The first display device 195A can be located on an exterior surface and/or other structure, of the autonomous vehicle 105 and/or configured such that a user can view and/or interact with the first display device 195A (and/or a user interface rendered thereon) from the exterior of the autonomous vehicle. For example, one or more windows of the autonomous vehicle 105 can include smart glass technology that can perform as the first display device 195A. The second display device 195B can be associated with the interior of the autonomous vehicle 105. The second display device 195B can be located on an interior surface and/or other structure (e.g., seat, etc.) of the autonomous vehicle 105 and/or configured such that a user can view and/or interact with the second display device 195B (and/or a user interface rendered thereon) from the interior of the autonomous vehicle 105. For example, a user device (e.g., tablet, etc.) located within the interior of the autonomous vehicle 105 can include the second display device 195B.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for one or more service entities. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 200 to communicate with, coordinate, manage, etc. autonomous vehicle(s) to perform the vehicle services of the service entity. A telecommunications network system can allow an autonomous vehicle 105 to utilize the back-end functionality of the respective operations computing system 200 (e.g., service assignment allocation, vehicle technical support, etc.).

An operations computing system 200 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system 250, etc.), a user device, etc. The operations computing system 200 can be or otherwise included in a data center for the service entity, for example. The operations computing system can be distributed across one or more location(s) and include one or more sub-systems. The computing device(s) of an operations computing system 200 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle (s), etc.

In some implementations, the operations computing system 200 and the vehicle computing system 100 can indirectly communicate. For example, a vehicle provider computing system can serve as an intermediary between the operations computing system and the vehicle computing system 100 such that at least some data is communicated from the operations computing system 200 (or the vehicle computing system 100) to the vehicle provider computing system and then to the vehicle computing system 100 (or the operations computing system 200).

Figure 2:
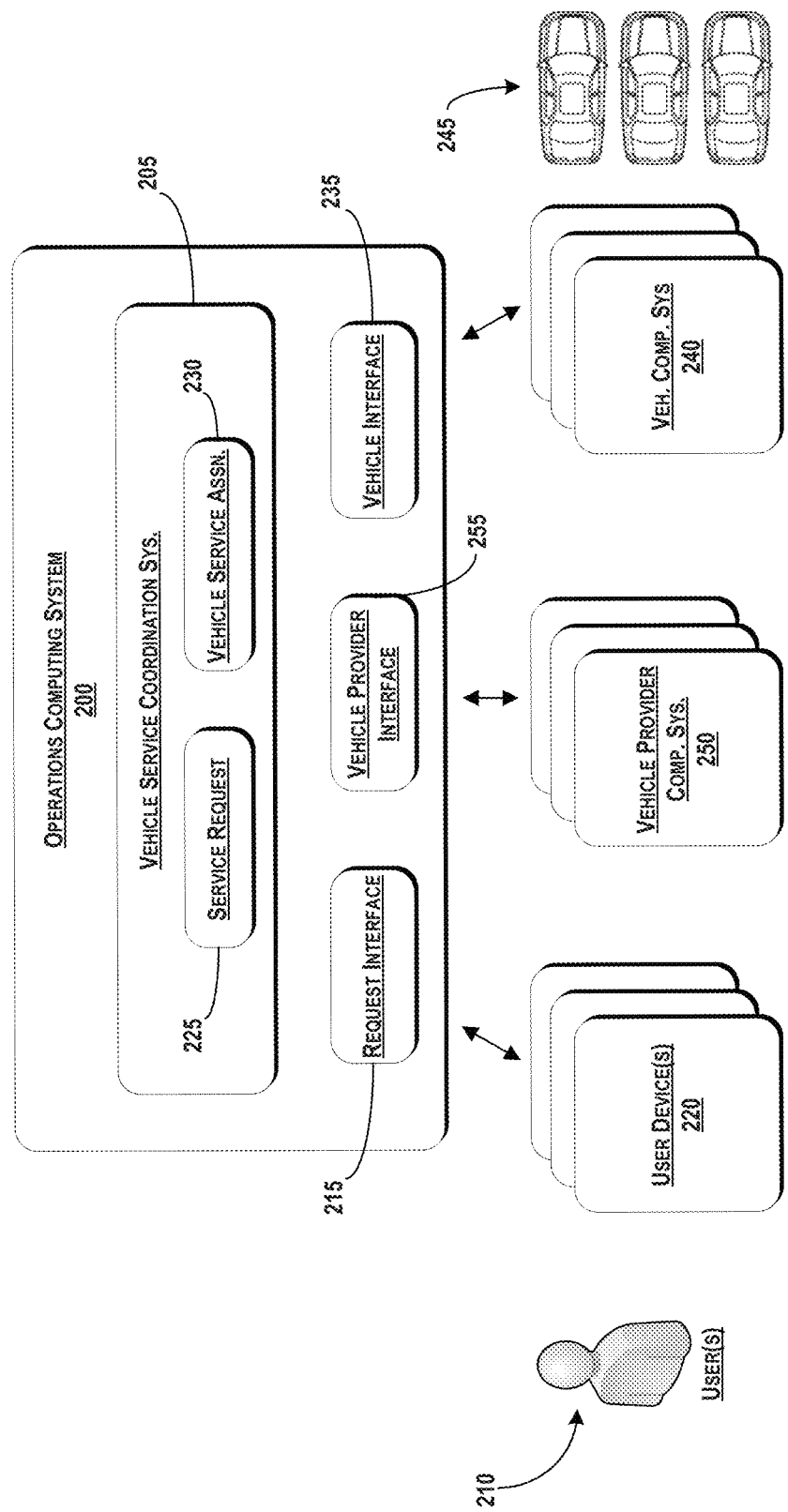
FIG. 2 depicts an example operations computing system of a service entity according to example embodiments of the present disclosure.

An operations computing system 200 can be configured to select and assign tasks to autonomous vehicles. FIG. 2 depicts the example operations computing system 200 according to example embodiments of the present disclosure. The operations computing system 200 can be associated with one or more service entities. The operations computing system 200 can include, for example, a vehicle service coordination system 205, and/or other systems.

The vehicle service coordination system 205 can be configured to coordinate the provision of one or more vehicle services to one or more users 210. For instance, the operations computing system 200 can include a request interface 215. The request interface 215 can allow the operations computing system 200 to communicate with one or a plurality of user devices 220 (e.g., mobile phones, desktops, laptops, tablets, game systems, etc.). The request interface 215 can allow the operations computing system 200 and the user device(s) 220 to communicate data to and/or from one another. For example, the user device(s) 220 can communicate (e.g., via the request interface 215) data indicative of a service request 225 for a vehicle service to an operations computing system 200 associated with a service entity.

The vehicle service coordination system 205 can be configured to generate a service assignment 230. A service assignment 230 can be indicative of a vehicle service (e.g., requested by a user via the user device(s) 220) to be performed by a vehicle (e.g., an autonomous vehicle). A service assignment 230 can include a variety of information associated with the vehicle service, the requesting user, the user device, the service entity, etc. For example, a service assignment 230 can include data indicative of an associated user and/or user device (if permitted), data indicative of a compensation parameter (e.g., the compensation for delivering an item to a user, couriering an item for a user, transporting a user, etc.), data indicative of one or more locations (e.g., origin location, destination location, intermediate location, etc.), data indicative of a type of vehicle service (e.g., transportation service, delivery service, courier service, etc.), data indicative of the type of cargo for the vehicle service (e.g., passengers, luggage, packages, food, time-sensitive mail, etc.), data indicative of a vehicle type/size (e.g., sedan, sport utility vehicle, luxury vehicle, etc.), data indicative of one or more time constraints (e.g., pick-up times, drop-off times, time limits for delivery, service duration, etc.), data indicative of user preferences (e.g., music, temperature, etc.), data indicative of one or more vehicle service parameters (e.g., luggage types, handle-with-care instructions, special pick-up requests, etc.), data indicative of the vehicle capacity required/preferred for the vehicle service (e.g., the number of seats with seatbelts, an amount of trunk space, an amount of cabin space, etc.), data indicative of user ratings, data indicative of one or more vehicle service incentives (e.g., increased compensation, increased ratings, priority treatment, etc.), and/or other types of data.

The operations computing system 200 (e.g., the vehicle service coordination system 205) can identify one or more autonomous vehicles that are available for a service assignment 230. The vehicle service coordination system 205 can identify autonomous vehicle(s) that are online with the service entity associated with the operations computing system 200. The vehicle service coordination system 205 can select an autonomous vehicle for the service assignment based at least in part on the data indicated in the service assignment. For example, the vehicle service coordination system 205 can select an autonomous vehicle that meets the preferences of the user 210, has the necessary capacity, is the requested vehicle type, etc. Additionally, or alternatively, the vehicle service coordination system 205 can select an autonomous vehicle based at least in part on the current and/or future location of the autonomous vehicle. For example, the vehicle service coordination system 205 can select an autonomous vehicle that is proximate to an origin location associated with the service assignment 230. Additionally, or alternatively, the vehicle service coordination system 205 can select an autonomous vehicle that is within and/or nearby a geographic area that includes the origin location and/or destination location of the service assignment 230.

The operations computing system 200 can utilize a vehicle interface 235 to communicate data indicative of a service assignment 230 to one or more vehicle computing systems 240 of one or more autonomous vehicles 245. The vehicle computing system(s) 240 can include the vehicle computing system 100 and/or be configured in similar manner (e.g., as shown in FIG. 1) and the autonomous vehicle(s) 245 can include the autonomous vehicle 105. The vehicle interface 235 can allow the operations computing system 200 and one or a plurality of vehicle computing systems 240 (e.g., of one or a plurality of autonomous vehicles 245) to communicate data to and/or from one another. For example, the operations computing system 200 can communicate, via the vehicle interface 235, data indicative of a service assignment 230 to one or more vehicle computing system(s) 240 of the autonomous vehicles 245 that the operations computing system 200 selects for the service assignment 230. Additionally, or alternatively, the vehicle computing system(s) 240 can communicate data associated with the autonomous vehicle(s) 245 to the operations computing system 200. In this way, the operations computing system 200 can coordinate the performance of vehicle service(s) for user(s) by the autonomous vehicle(s) 245 as well as monitor the autonomous vehicle(s) 245. The autonomous vehicle(s) 245 can include and/or be configured in the same or a similar manner to the autonomous vehicle 105 shown in FIG. 1.

In some implementations, the operations computing system 200 can select a non-autonomous vehicle (e.g., human driven vehicle) for a service assignment 230. For example, the vehicle service coordination system 205 can select a non-autonomous vehicle that is proximate to a location associated with the service assignment 230. Additionally, or alternatively, the vehicle service coordination system 205 can select a non-autonomous vehicle that is within and/or nearby a geographic area that includes the origin location and/or destination location of the service assignment 230. The operations computing system 200 can communicate data indicative of a service assignment 230 to one or more computing devices associated with the selected non-autonomous vehicle (e.g., a mobile device of the vehicle operator). The service assignment 230 can be indicative of a request that the operator provide the requested vehicle service to a user associated with the service assignment 230.

In some implementations, the operations computing system 200 can communicate with one or more vehicle provider computing systems 250 (associated with one or more vehicle providers) via a vehicle provider interface 255. The vehicle provider computing system(s) 250 can be associated with vehicle provider(s) that are associated with the autonomous vehicle(s) 245. A vehicle provider can include, for example, an owner, a manufacturer, a vendor, a manager, a coordinator, a handler, etc. of the autonomous vehicle 105 (e.g., a third party, etc.). The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system 250 that is remote from the autonomous vehicle 105 to communicate (e.g., over one or more wireless communication channels) with the vehicle computing system(s) 240 of one or more autonomous vehicles 245. A vehicle provider computing system 250 can include a server system (e.g., of an entity), a user device (e.g., of an individual owner), and/or other types of computing systems.

The vehicle provider interface 255 can allow the operations computing system 200 and one or a plurality of vehicle provider computing systems 250 (e.g., of one or more vehicle providers, etc.) to communicate data to and/or from one another. For example, the operations computing system 200 can communicate, via the vehicle provider interface 255, data indicative of a service assignment 230, and/or other data as described herein, to one or more vehicle provider computing system(s) 250. The vehicle provider computing system(s) 250 can then communicate such data to the vehicle computing system(s) 240. Additionally, or alternatively, the vehicle provider computing system(s) 250 can communicate data associated with one or more autonomous vehicles 245 (and/or other data) to the operations computing system 200.

A service entity may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, an autonomous vehicle 245 that is associated with a vehicle provider, but that is online only with that service entity (e.g., available to accept service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity. For example, an autonomous vehicle 245 that is currently online with two different service entities so that the autonomous vehicle 245 may accept service assignment(s) 230 from either service entity (e.g., from the operations computing systems associated therewith, etc.) may be considered to be part of a non-dedicated supply of autonomous vehicles. In some implementations, whether a vehicle is considered to be part of the dedicated supply or the non-dedicated supply can be based, for example, on an agreement between the service entity and a vehicle provider associated with the autonomous vehicle 245.

Returning to FIG. 1, to help avoid inefficient vehicle re-routing and non-essential depletion of vehicle resources during the performance of a vehicle service, an autonomous vehicle 105 can present a user 210 (shown in FIG. 2) with a checklist associated with a destination location associated with the user. To do so, the vehicle computing system 100 of the autonomous vehicle 105 can obtain data indicative a destination location associated with a user 210 of an autonomous vehicle 105. For instance, a user 210 can submit a request to be transported from an origin location to a destination location via a user device 220 (shown in FIG. 2) associated with the user 210. The operations computing system 200 can generate a service assignment 230 (shown in FIG. 2) based at least in part on the service request 225 (shown in FIG. 2) and communicate data indicative of the service assignment 230 to the autonomous vehicle 105.

The vehicle computing system 100 can obtain data indicative of the service assignment 230 associated with the autonomous vehicle 105. As described herein, the service assignment 230 can be indicative of a destination location (e.g., for a requested vehicle service). For example, the service assignment 230 can indicate that the autonomous vehicle 105 is to transport a user 210 from the origin location to the destination location. The origin location and/or the destination location can be represented as a coordinate (e.g., GPS coordinate, etc.), latitude-longitude pair, address, semantic location, and/or other type of identifier.

Figure 3:
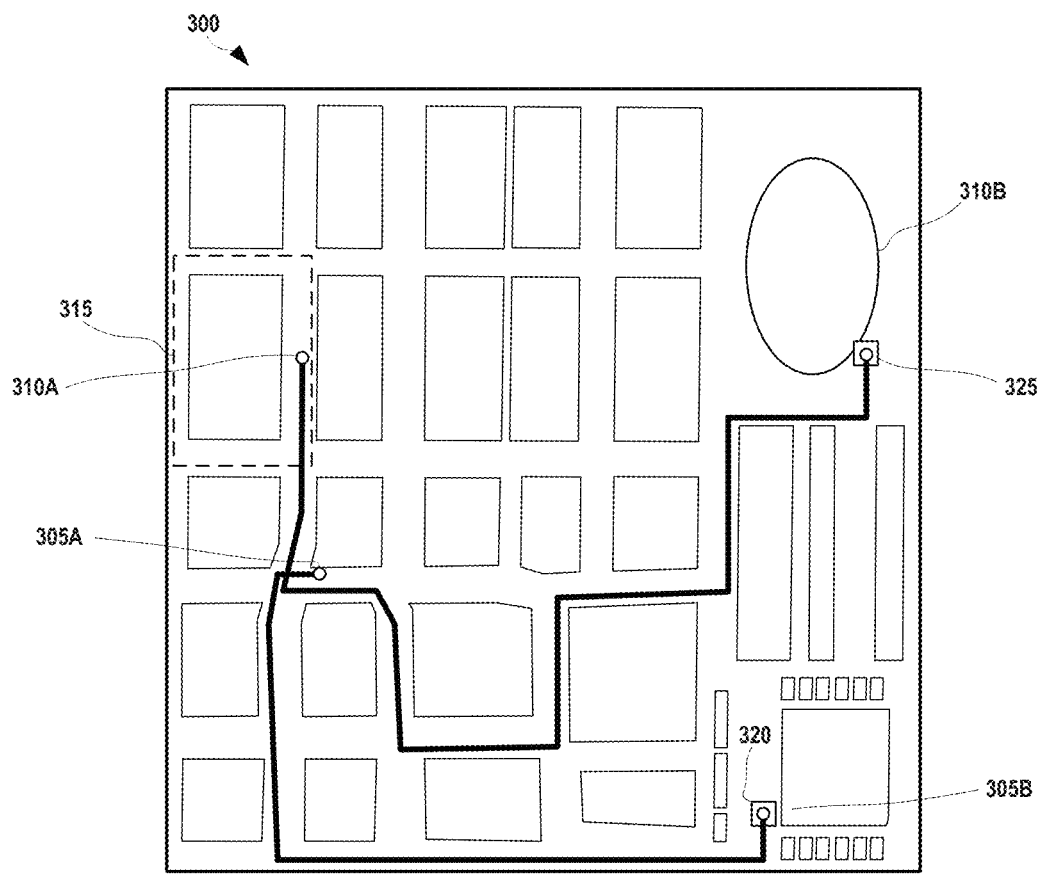
FIG. 3 depicts an example geographic area according to example embodiments of the present disclosure.

By way of example, FIG. 3 depicts an example geographic area 300 according to example embodiments of the present disclosure. A user 210 can request transportation from a first origin location 305A (e.g., a home) to a first destination location 305B (e.g., an airport). In another example, a user 210 can request transportation from a second origin location 310A (e.g., a hotel) to a second destination location 310B (e.g., a stadium).

To help avoid vehicle re-routing and the depletion of vehicle resources associated therewith, the vehicle computing system 100 can generate a checklist for user 210 to complete before the autonomous vehicle 105 initiates travel to a destination location. For instance, with reference to FIG. 4A, the vehicle computing system 100 can determine a checklist 400A associated with the destination location based at least in part on the data indicative of the service assignment 230. For instance, the vehicle computing system 100 can determine a checklist 400A for the user 210 based at least in part on the destination location. By way of example, the first destination location 305B can include an airport. The vehicle computing system 100 can determine a checklist 400A that is associated with the airport.

The checklist 400A can include a plurality of checklist elements 405A-F (e.g., checklist items, questions, tasks, reminders, notifications, etc.) associated with the destination location. The checklist elements 405A-F can indicate, for example, item(s), task(s), question(s), reminder(s), note(s), and/or other information for a user 210 to consider before the autonomous vehicle 105 travels to the destination location. By way of example, for the airport destination, the checklist 400A can include a plurality of checklist elements 405A-F that are associated with an airport. For instance, at least a portion of the plurality of checklist elements 405A-E can be indicative of items for the user to consider when travelling to the airport (e.g., plane tickets, identification/passport, immigration papers, luggage, etc.). Additionally, or alternatively, one or more checklist elements (e.g., 405F) can present a task for the user to consider (e.g., check-in to flight, etc.). The checklist elements 405A-F can also present one or more questions associated with the destination location. For example, a checklist element 405D may include a question asking the user 210 which airline the user 210 is flying (if such information is not already known by the autonomous vehicle 105) and/or a checklist element 405E may include a question asking for the user's flight information (e.g., flight #, flight time, etc.). In some implementations, the vehicle computing system 100 can use the answer to this question to help navigate the autonomous vehicle 105 (e.g., to the appropriate departure terminal), as further described herein.

Figure 4A:
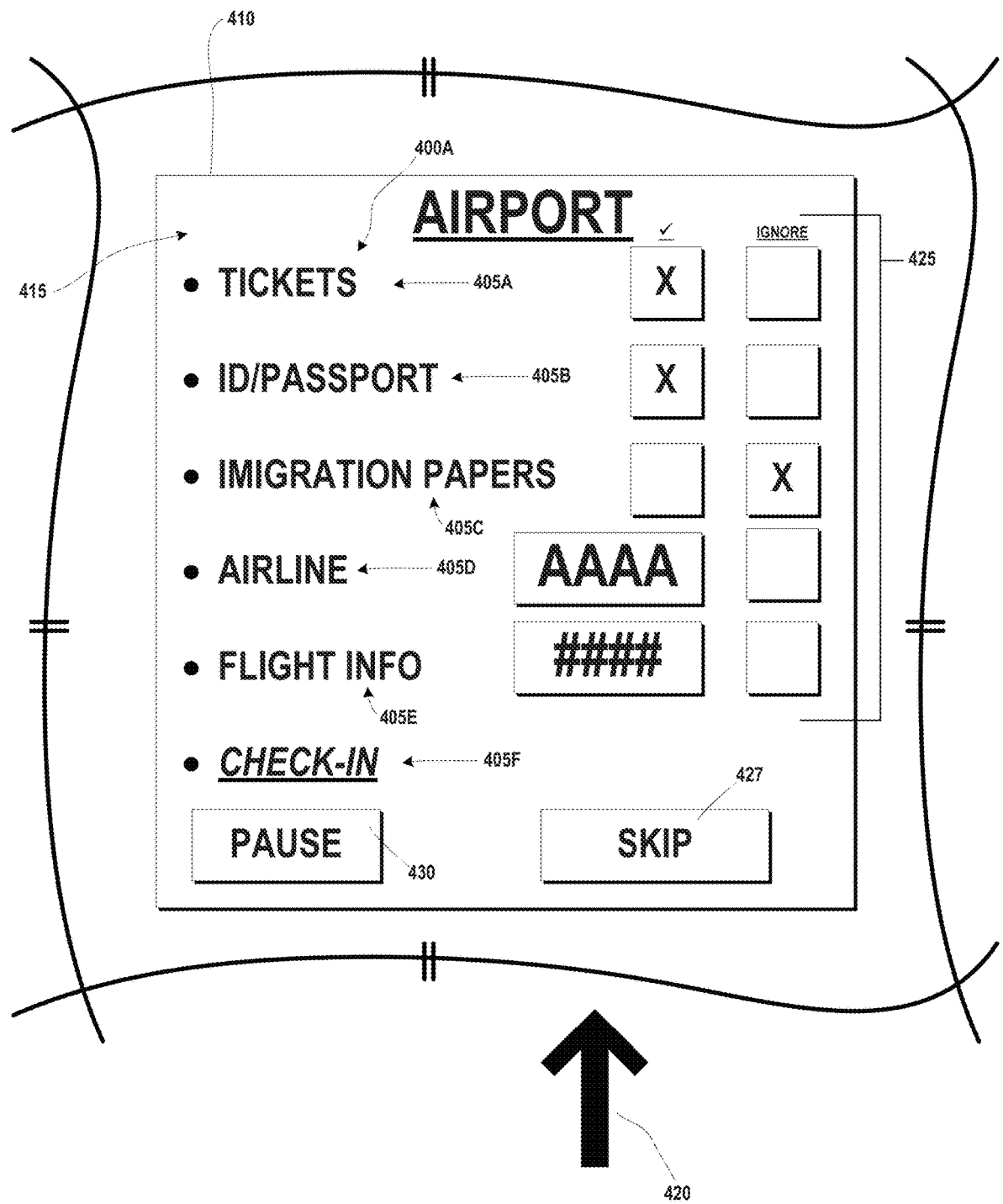
FIGS. 4A-B depict example display devices with a checklist according to example embodiments of the present disclosure.
Figure 4B:
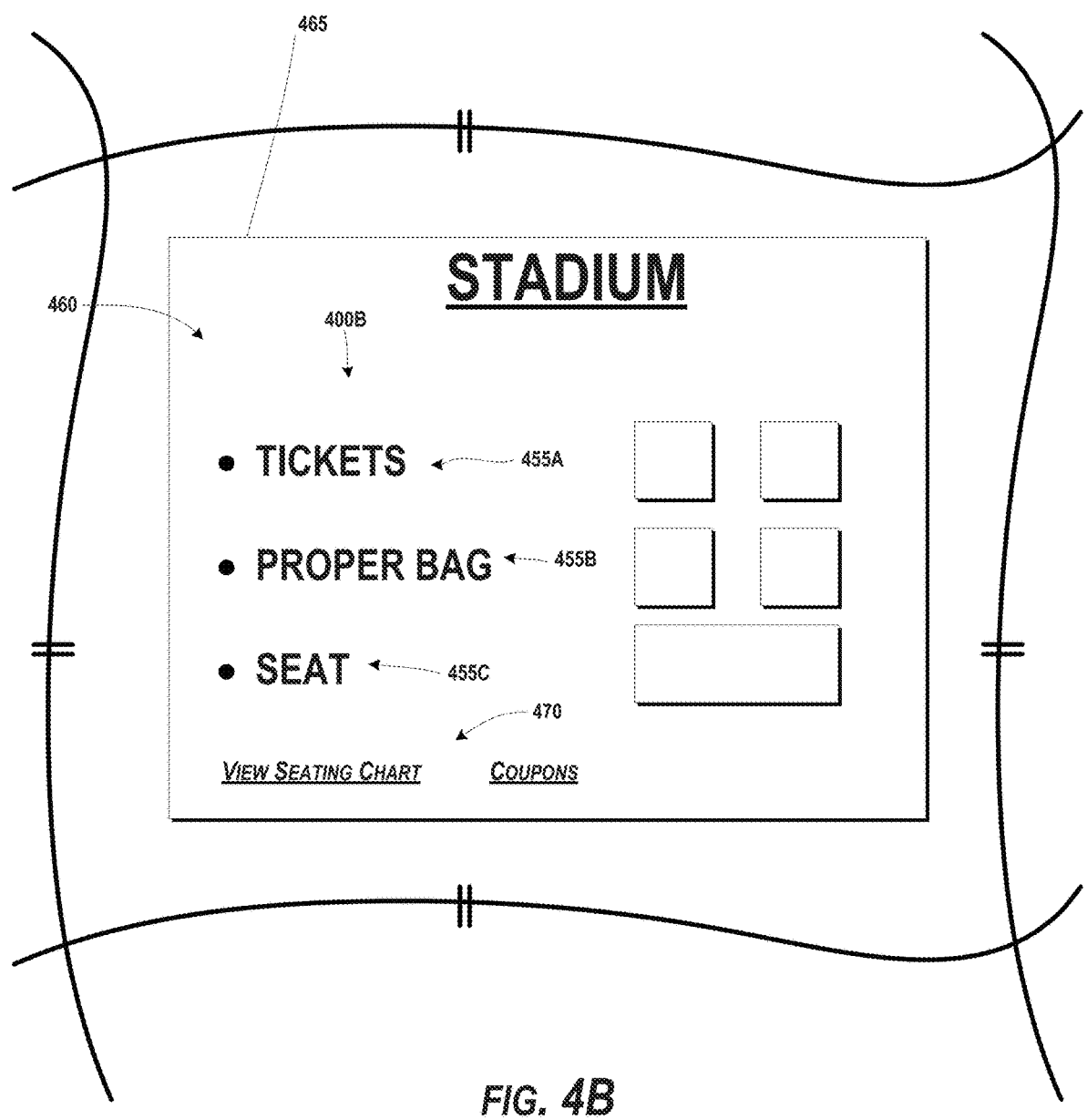

In another example, with reference to FIG. 4B, the second destination location 310B (shown in FIG. 3) can include a stadium. The vehicle computing system 100 can determine a checklist 400B that is associated with the stadium. By way of example, for the stadium destination, the checklist 400B can include a plurality of checklist elements 455A-C that are associated with the stadium. For instance, at least a portion of the plurality of checklist elements 455A-B can be indicative of items for the user 210 to consider when travelling to the stadium (e.g., event tickets, proper baggage, etc.). In some implementations, a checklist element 455C can present one or more questions and/or tasks associated with the stadium. For example, a checklist element 455C may include a question asking the user 210 for the user's seat assignment within the stadium. In some implementations, the vehicle computing system 100 can use the answer to a question to help navigate the autonomous vehicle 105 (e.g., to the appropriate stadium entrance gate), as further described herein.

In some implementations, the vehicle computing system 100 can obtain data indicative of a checklist from a remote computing system. For instance, the operations computing system 200 (and/or a vehicle provider computing system 250) can be configured to determine the checklist(s) 400A-B based at least in part on a service request 225 and/or service assignment 230. The operations computing system 200 can communicate data indicative of the checklist(s) 400A-B to the vehicle computing system (and/or a vehicle provider computing system 250). The vehicle computing system 100 can obtain the data indicative of the checklist(s) 400A-B (and its checklist elements) from the operations computing system 200 (and/or a vehicle provider computing system 250). In some implementations, the data indicative of the checklist(s) 400A-B can be included with data indicative of the service assignment 230 that is communicated to the vehicle computing system 100.

In some implementations, the checklist can be based at least in part on data obtained via a software application on a user device 220 of the user 210. For example, in some implementations, the user device 220 can include a software application that allows the user 210 to submit a service request for a vehicle service. The software application may be associated with a user interface that allows the user 210 to provide user input indicative of a checklist (e.g., grocery list, list of items for a tailgate, etc.). The data indicative of the user-generated checklist can be communicated from the user device 220 to the operations computing system 200 (and/or another computing system) and, in turn, communicated to the vehicle computing system 100. In some implementations, the software application on the user device 220 can obtain data indicative of a checklist from another software application on the user device 220 (e.g., a notes application, email application, text message application, etc.). For example, data indicative of a grocery checklist can be generated based at least in part on information from a shopping application that indicates previously purchased groceries by the user 210. The user 210 can be prompted to determine whether such access and/or communications are permitted.

Figure 5:
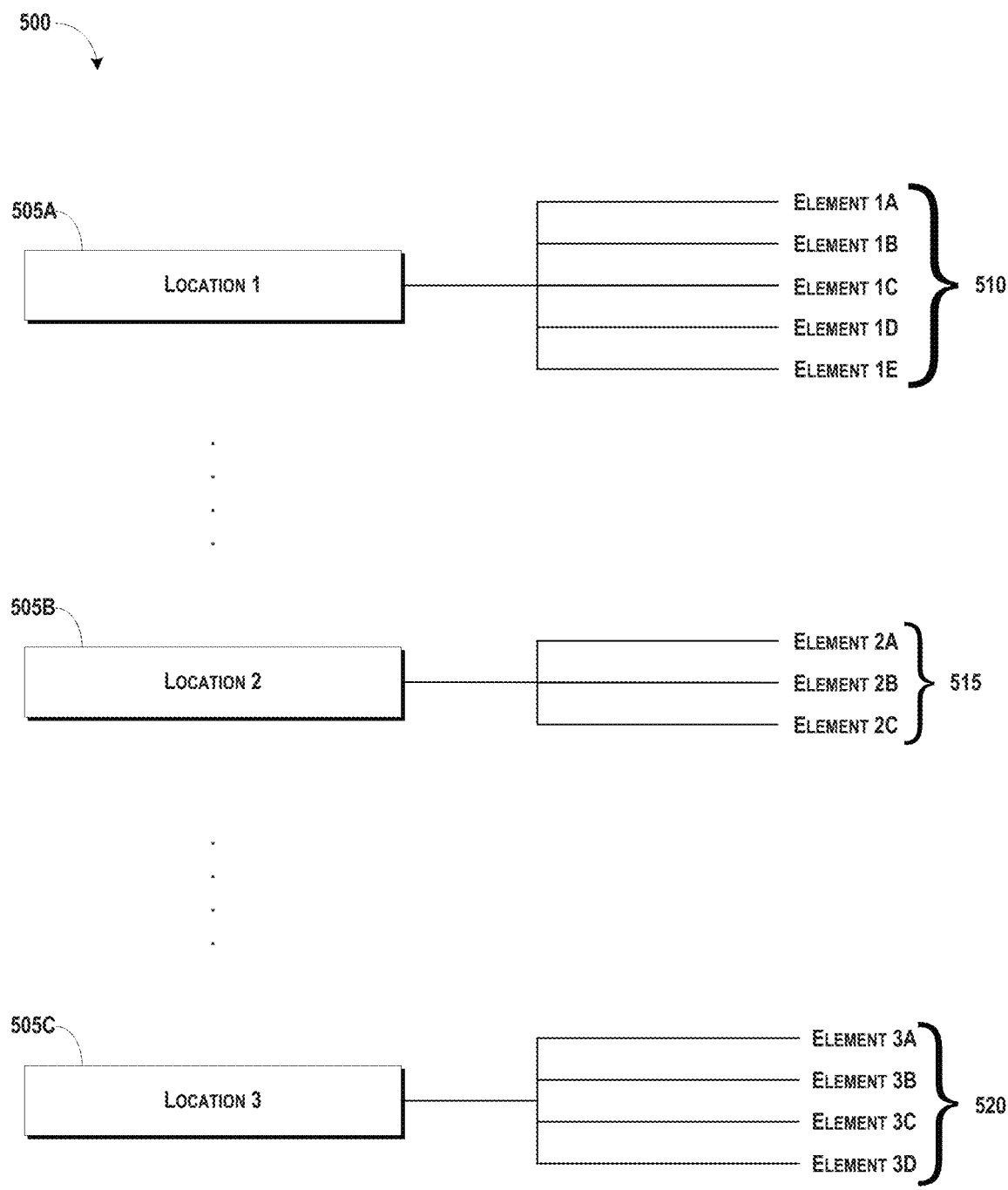
FIG. 5 depicts an example checklist data structure according to example embodiments of the present disclosure.

In some implementations, the vehicle computing system 100 can determine a checklist 400A-B based at least in part on a checklist data structure. FIG. 5 depicts an example checklist data structure 500 according to example embodiments of the present disclosure. The vehicle computing system 100 can access the checklist data structure 500 via an onboard and/or remote memory. The checklist data structure 500 can include a hierarchy, tree structure, etc. that can be traverse (e.g., by the vehicle computing system 100) to determine which checklist/checklist elements should be utilized for a particular destination location. By way of example, the checklist data structure 500 can include a data tree with a plurality of parent nodes 505A-C. Each parent node 505A-C can be indicative of a destination location. For example, a first parent node 505A can be indicative of a first location (e.g., an airport), a second parent node 505B can be indicative of a second location (e.g., a stadium), a third parent node 505C can be indicative of a third location (e.g., a restaurant), etc. A parent node 505A-C can be indicative of a type of destination location (e.g., that can be used for multiple airports, stadiums, restaurants, etc.) and/or a specific destination location (e.g., the main airport in City A, a baseball stadium in City A, etc.).

Each parent node 505A-C can have child nodes or branches. Each of the child nodes can be indicative of a checklist element such as, for example, an item, task, reminder, question, note, etc. to be included on the checklist for that particular location. For example, a first parent node 505A representing an airport can have a first plurality of child nodes 510. Each child node of the first plurality of child nodes 510 can represent a different item task, reminder, question, etc. for the user to consider before travelling to the airport. For example, the child nodes 510 can be reminders for the user's plane ticket, identification/passport, immigration papers, luggage, etc., tasks reminding the user to check-in to the flight, and/or questions asking for the user's flight information (e.g., airline, flight number, etc.). In another example, a second parent node 505B representing a stadium can have a second plurality of child nodes 515. Each child node of the second plurality of child nodes 515 can represent a different item task, reminder, question, etc. for the user to consider before travelling to the stadium (e.g., a reminder to have event tickets, a reminder to have proper baggage, request for seat assignment information, etc.). In yet another example, a third parent node 505C representing a restaurant can have a third plurality of child nodes 520. Each child node of the third plurality of child nodes 515 can represent a different item task, reminder, question, etc. for the user to consider before travelling to the restaurant (e.g., a reminder to have reservations, a reminder to confirm a reservation, a reminder regarding proper attire, a request to pre-order and item and/or identify dietary restrictions, etc.).

In some implementations, the child nodes can be indicative of customized and/or user-generated checklist elements. For instance, the user 210 may be able to customize the checklist elements that appear in a checklist via a user interface that can be presented via a display device on a user device. By way of example, the user 210 can be able to select which checklist elements to include on an airport checklist for the user 210. The checklist data structure 500 can be indicative of the checklist elements selected by the user 210. In some implementations, a plurality of child nodes can be indicative of checklist elements generated by a user and/or a software application. By way of example, for a parent node that is associated with a grocery store destination location, the child nodes can be indicative of checklist elements that are associated with a grocery checklist generated by the user 210 (e.g., as entered into a user interface, obtained via a second software application, etc.) and/or generated by a software application (e.g., based on previously purchased groceries, etc.).

To utilize the checklist data structure 500, the vehicle computing system 100 can determine the destination location. For example, the vehicle computing system 100 can process the data indicative of the service assignment 230 to identify the destination location. In some implementations, the service assignment 230 can indicate the destination location as a semantic name (e.g., the Main Airport of City A) and the vehicle computing system 100 can determine the destination location based at least in part on the semantic name. In some implementations, the service assignment 230 can indicate the destination location with another identifier (e.g., a GPS coordinate, a lat-long coordinate pair, an address, etc.) and the vehicle computing system 100 can determine the type of the destination location and/or the specific destination location based at least in part on the identifier. For example, the vehicle computing system 100 can match the identifier to map data 145 to determine the first destination location 305B (shown in FIG. 3) is an airport.

The vehicle computing system 100 can traverse the checklist data structure 500 to find the parent node that is indicative of the determined destination location. The vehicle computing system 100 can traverse the child nodes associated with the parent node to determine which checklist elements to include in a checklist for the user to be transported to the determined location. For example, in the event that the vehicle computing system 100 determines that the first destination location 305B is an airport, the vehicle computing system 100 can traverse the checklist data structure 500 to find the first parent node 505A associated with an airport destination location. Once the first parent node 505A is found, the vehicle computing system 100 can traverse the first plurality of nodes 510 to determine what checklist elements 405A-F should be included in the checklist 400A for the user 210 going to the airport.

With reference to FIG. 4A, the vehicle computing system 100 can provide, for display via a display device 410, data indicative of a user interface 415 that presents the checklist 400A. The user interface 415 can be displayed on a variety of devices. In some implementations, the user interface 415 can be displayed via the first display device 195A (shown in FIG. 1) which can be positioned such that the user interface 415 presenting the checklist 400A is viewable by the user 210 from an exterior of the autonomous vehicle 105. The user 210 can interact with the first display device 195A from the exterior of the autonomous vehicle 105. For example, one or more windows of the autonomous vehicle 105 can include smart glass technology that can perform as the first display device 195A for presenting the user interface 415. The user 210 can interact with the smart glass window (e.g., via a touch interaction) to address the checklist elements 405A-F. The user interface 415 presenting the checklist 400A can be displayed on the first display device 195A before, during, and/or after the autonomous vehicle 105 arrives to pick-up the user 210.

Additionally, or alternatively, the user interface 415 can be displayed via the second user device 195A (shown in FIG. 1) associated with the interior of the autonomous vehicle 105. For example, the second user device 195A can be a user device (e.g., a tablet) that is typically kept inside the cabin of the autonomous vehicle 105. The user interface 415 presenting the checklist 400A can be displayed via the second user device 195A (e.g., the table) within the interior of the autonomous vehicle 105. The user interface 415 presenting the checklist 400A can be displayed on the second display device 195B before, during, and/or after the autonomous vehicle 105 arrives to pick-up the user 210.

Additionally, or alternatively, the user interface 415 can be displayed via a user device 220 (shown in FIG. 2) associated with a user 210. The user device 220 (e.g., a mobile phone, tablet, laptop, etc.) can belong to, be owned by, be used by, etc. the user 210. Data indicative of the checklist 400A can be provided to the user device 220 (e.g., a mobile phone, etc.) of the user 210 and the user interface 415 can be rendered via the display device 410 of the user device 220. The user interface 415 presenting the checklist 400A can be displayed on the user device 220 associated with the user 210 (and/or another display device) before, during, and/or after the autonomous vehicle 105 arrives to pick-up the user 210.

In some implementations, the display device via which the user interface 415 (including the checklist 400A) is displayed can be chosen based at least in part on environmental conditions associated with the autonomous vehicle 105. For instance, the vehicle computing system 100 can obtain data indicative of the weather condition(s) surrounding the autonomous vehicle 105 (e.g., by analyzing acquired sensor data to determine the weather condition(s), obtaining data from a remote computing system indicative of the weather condition(s), etc.). The vehicle computing system 100 can select a display device from among a plurality of display devices (e.g., the first display device 195A, the second display device 195B, the user device of the user, etc.) for displaying the user interface 415 indicative of the checklist 400A based at least in part on the weather condition(s). For example, in the event that it is raining, the vehicle computing system 100 can provide the data indicative of the checklist 400A to a user device within the interior of the autonomous vehicle 105 (e.g., an onboard tablet) so that the user interface 415 presenting the checklist 400A can be rendered via the second display device 195B (via its display device) inside the vehicle. Additionally, or alternatively, the vehicle computing system 100 can provide the data indicative of the checklist 400A to a user device 220 of the user 210. In this way, the user 210 can avoid being in the rain while attempting to complete the checklist 400A.

In another example, the vehicle computing system 100 can obtain data indicative of traffic condition(s) surrounding the autonomous vehicle 105 (e.g., by analyzing acquired sensor data to determine a level of traffic, obtaining traffic data from a remote computing system, etc.). The vehicle computing system 100 can select a display device from among a plurality of display devices (e.g., the first display device 195A, the second display device 195B, the user device 220 of the user 210, etc.) for displaying the user interface 415 based at least in part on the traffic condition(s). For example, in the event that the autonomous vehicle 105 may be stopped on a busy travel way to safely pick-up the user 210, the vehicle computing system 100 can provide the data indicative of the checklist 400A to a user device within the interior of the autonomous vehicle 105 (e.g., an onboard tablet) so that the user interface 415 presenting the checklist 400A can be rendered via the second display device 195B inside the vehicle 105. In this way, the user 210 can board the autonomous vehicle 105 in the event that the vehicle computing system 100 determines that the autonomous vehicle 105 should move (e.g., circle the block, etc.) to help prevent a traffic build-up.

In some implementations, a user interface can present other types of information associated with the user's destination location. This information can include, for example, coupons, promotions, deals, sales, news, weather information, etc. associated with a destination location. By way of example, with reference to FIG. 4B, the second destination location 310B can include a stadium. The user interface 460 displayed via the display device 465 (associated with the exterior and/or interior of the vehicle) can present information 470 related to a team participating in an upcoming event at the stadium, coupons for food to be purchased at the stadium, a stadium seating chart, etc.

With reference to FIG. 3, the autonomous vehicle 105 can be prohibited from travelling to a destination location 305B, 310B until the associated checklist 400A-B has been completed. For example, the autonomous vehicle 105 can remain in a parked position (e.g., at the first origin location 305A, in a parked mode, etc.) until the checklist 400A has been completed. A checklist can be completed when the user 210 addresses each checklist element, as further described herein. Additionally, or alternatively, the autonomous vehicle 105 can be prohibited from travelling outside a limited geographic area 315 until a checklist has been completed. For example, the autonomous vehicle 105 may pick-up the user 210 at the second origin location 310A. The second origin location 310A can be located on a busy street. The autonomous vehicle 105 may circle a block proximate the second origin location 310A (e.g., within the limited area 315) until the checklist 400B is completed (e.g., the checklist elements 455A-C are addressed by the user 210). In this way, the autonomous vehicle 105 can avoid traffic disruptions while the user 210 is completing the checklist 400B and also remain in proximity to the second origin location 310A in the event the user 210 decides to retrieve an item (e.g., a forgotten passport, etc.). In the event that the user 210 exits the autonomous vehicle 105 to retrieve an item, etc. the autonomous vehicle 105 can continue to traveling within the limited geographic area 315. In some implementations, the autonomous vehicle 105 can be assigned to a new service assignment and another autonomous vehicle can travel to the origin location for the user 210. This can be done while the user 210 retrieves the item, etc. for limited (if any) disruption to the user 210. A notification can be sent to the user device 220 of the user 210 indicating such a change.

The vehicle computing system 100 can determine that a checklist has been completed based at least in part on user input associated with the checklist. For instance, with reference to FIG. 4A, the vehicle computing system 100 can obtain data indicative of user input 420 associated with the plurality of checklist elements 405A-F. The user input 420 can indicate that the user 210 has addressed the checklist elements 405A-F. The user input 420 can include touch interaction, cursor interaction, voice input, text input, and/or other types of user input. For instance, the user interface 415 can present user interface elements 425 (e.g., checkboxes, toggles, soft buttons, text entry boxes, etc.) that allow a user 210 to indicate that a checklist element 405A-F has been addressed. By way of example, the user 210 can provide a touch interaction to a display device 410 (e.g., an interactive display screen) that checks a checkbox associated with a reminder for the user to bring the user's plane tickets to the airport.

In some implementations, the user 210 can begin to complete the checklist 400A before the autonomous vehicle 105 arrives at the destination location. For example, user device 220 can obtain data indicative of a checklist 400A (e.g., from a remote computing system, user-generated checklist, from a software application, etc.). The user device 220 can provide the data indicative of the checklist 400A for display via a user interface 415 on a display device 410 (e.g., of the user device 220). The user interface 415 to be presented to the user 210 after data indicative of a service request 225 has been communicated to a remote computing system (e.g., an operations computing system 200) and/or while the autonomous vehicle 105 is en route to the origin location. The user device 220 can obtain data indicative of user input associated with the checklist 400A before and/or after the autonomous vehicle 105 arrives at the origin location. The user device 200 can determine which of the checklist elements have been addressed (e.g., completed or ignored) based at least in part on the user input. Data indicative of the addressed (and/or unaddressed) checklist items can be provided by the user device 220 to a remote computing system (e.g., an operations computing system 200, the vehicle computing system 100). In the event the checklist 400A has not yet been completed, the checklist 400A (e.g., with all or some of the checklist elements) can be presented on a display device associated with the autonomous vehicle 105, as described herein.

In some implementations, the vehicle computing system can verify that one or more checklist elements have been completed. For instance, the user 210 can utilize a user device 220 to take an image of one or more items associated with a checklist element 405B (e.g., a passport). The user device 220 can obtain data associated with the image of one or more items associated with the user 210. The user device 220 can communicate the image data to a remote computing system (e.g., an operations computing system 200, the vehicle computing system 100, etc.). The vehicle computing system 100 can obtain (e.g., via the user device 220, the operations computing system 200, etc.) the data associated with the image of one or more items associated with the user 210 (e.g., the passport). The vehicle computing system 100 can verify that at least one checklist element 405B of the checklist 400A has been completed based at least in part on the data associated with the image of the one or more items associated with the user 210. In some implementations, data indicative of one or more items associated with the user 210 (e.g., passport, ID, immigration papers, etc.) can be securely stored with a profile associated with the user 210 (if permitted by the user) and retrieved when the user 210 makes a service request 225, enters the vehicle 105, etc. By associating this information with the user's profile, a service entity may communicate reminders to the user 210 (e.g., via the user device 220) to verify that such item(s) are still up-to-date (e.g., by uploading new image data, by interacting with a prompt, etc.).

In some implementations, one or more of the checklist elements 405A-F can be optional such that the user 210 can indicate that the checklist element 405A-F should be ignored. For example, in the event that the user 210 is travelling to an airport, a checklist element 405C can remind the user 210 to bring the user's immigration papers to the airport. In the event that this reminder is not applicable to the user 210, the user 210 can provide user input (e.g., touch interaction, etc.) to the display device 410 to check an "IGNORE" checkbox associated with the checklist element 405C.

A checklist 400A can be continuously displayed via a user interface 415 on a display device 410 until all the checklist elements 405A-C are addressed (e.g., confirming, ignored, etc.). In the event that the user 210 realizes that the user 210 has forgotten an item (e.g., plane tickets), the user 210 can interact with a user interface element 430 to pause the checklist, request the autonomous vehicle 105 to return to the origin location (e.g., when circling the block, etc.), and/or to otherwise indicate that the user 210 is addressing an item on the checklist. The autonomous vehicle 105 can remain parked or return to the origin location (e.g., if circling the block) to allow the user 210 to address such an item (e.g., retrieve the forgotten plane tickets, etc.). The user interface 415 presenting the checklist 400A can continue to be displayed until the user 210 returns and addresses the remaining checklist element(s). The vehicle computing system 100 can determine that the checklist 400A has been completed once the vehicle computing system 100 obtains data indicative of user input 420 addressing all the checklist elements 405A-F (e.g., confirming, ignoring, etc.).

In some implementations, the user 210 can provide user input associated with a user interface element 427 to indicate that the user 210 chooses not to completed (wholly or partially) the checklist 400A. Activation of the user interface element 427 can be treated as if all the checklist elements (or remaining unaddressed checklist elements) have been completed. The autonomous vehicle 105 can begin to travel to the destination location 305B.

In response to determining that the checklist 400A has been completed, the vehicle computing system 100 can cause the autonomous vehicle 105 to initiate a motion control to travel to the destination location (e.g., the first destination location 305B). A motion control can be an operation, action, etc. that is associated with controlling the motion of the autonomous vehicle 105. For instance, upon completion of the checklist, the vehicle computing system 100 can control the autonomous vehicle 105 to travel to the destination location. The vehicle computing system 100 can adjust the mode of the autonomous vehicle 105 such that the autonomous vehicle 105 is no longer prohibited from travelling to the destination location. The vehicle computing system 100 can communicate one or more signals to initiate vehicle travel to the destination location. The autonomous vehicle 105 can initiate travel to the destination location using its onboard computing systems. For example, the vehicle computing system 100 (e.g., the autonomy system 130) can determine a motion plan 180 that can be provided to the vehicle control system(s) 135 of the autonomous vehicle 105 (shown in FIG. 1). The vehicle control system(s) 135 can be associated with a vehicle controller (e.g., including a vehicle interface) that is configured to implement the motion plan 180. The vehicle controller can, for example, translate the motion plan 180 into instructions for the appropriate vehicle control component (e.g., acceleration control, brake control, steering control, etc.). Once the user 210 has completed the checklist 400A, the vehicle computing system 100 can determine a motion plan 180 that initiates the autonomous vehicle 105 to travel to the destination location (e.g., the first destination location 305B). This motion plan 180 can be utilized to autonomously navigate the autonomous vehicle 105 to the user's destination location.

In some implementations, information acquired with respect to a checklist 400A can be utilized for controlling the autonomous vehicle 105. For instance, the vehicle computing system 100 can determine a sub-location associated with a destination location based at least in part on the user input 420 associated with at least one of the plurality of checklist elements 405A-F. Moreover, the vehicle computing system 100 can determine a sub-location associated with a destination location based at least in part on data associated with the destination location (e.g., map data associated with the destination location, etc.). The sub-location can be a more granular position with respect to the destination location.

By way of example, with reference to FIG. 3, the first destination location 305A can be an airport and a checklist 400A may include a question asking for the user's flight information (e.g., airline, flight number, etc.). The vehicle computing system 100 can utilize the flight information, data indicative of a flight index, an airport map, etc. to determine a first sub-location 320 associated with the first destination location 305A. For example, the first sub-location 320 can include an appropriate drop-off location for the user 210 at the airport (e.g., the most convenient departure terminal for that airline/flight). In another example, the second destination location 310B can be a stadium and a checklist 400B may include a question asking for the user's seat assignment. The vehicle computing system 100 can utilize the seat assignment and data associated with the stadium (e.g., a stadium map, seating chart, etc.) to determine a second sub-location 325. The second sub-location 325 can include an appropriate drop-off location for the user 210 at the stadium (e.g., the stadium entrance closest to the user's seats). The user 210 can disembark from the autonomous vehicle 105 at the destination location/sub-location.

When the autonomous vehicle 105 is assigned a new service assignment, the vehicle computing system 100 can determine a new checklist for the new service assignment (e.g., based at least in part on the destination location associated therewith). The vehicle computing system 100 can repeat the process described herein for generating the new checklist, determining that the new checklist has been completed, and controlling the autonomous vehicle 105.

Figure 6:
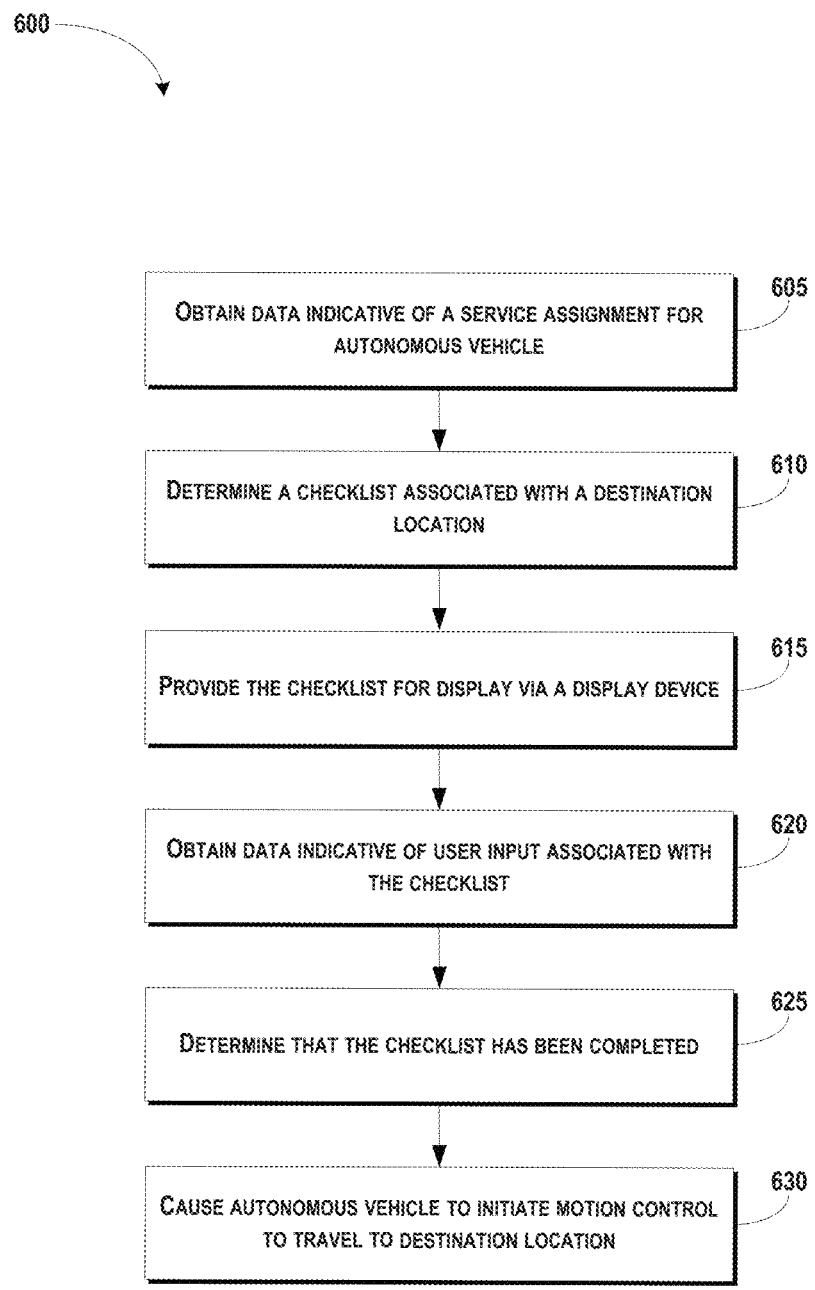
FIG. 6 depicts an example method for determining a checklist for an autonomous vehicle user and controlling an autonomous vehicle according to example embodiments of the present disclosure.

FIG. 6 depicts a flow diagram of an example method 600 for controlling an autonomous vehicle according to example embodiments of the present disclosure. One or more portion (s) of the method 600 can be implemented by a computing system that includes one or more computing devices such as, for example, the computing systems described with reference to the other figures (e.g., a vehicle computing system 100/240, an operations computing system 200, a vehicle provider computing system 250, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1, 2, 7 and/or 8), for example, to generate a checklist and control an autonomous vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/ terms described with respect to other systems and figures for example illustrated purposes and is not meant to be limiting. One or more portions of method 800 can be performed additionally, or alternatively, by other systems.

At (605), the method 600 can include obtaining data indicative of a service assignment for an autonomous vehicle. For instance, a computing system (e.g., a vehicle computing system 100, etc.) can obtain data indicative of a service assignment associated with an autonomous vehicle. The service assignment can be indicative of a destination location for a vehicle service. By way of example, a user can request a vehicle service (e.g., via a software application of a user device). The service assignment can be associated with the requested vehicle service. The service assignment can indicate an origin location at which to pick-up a user and a destination location at which to drop-off the user. By way of example, the destination location can include an airport. In another example, the destination location can include a stadium. The computing system can obtain the data indicative of the service assignment from a remote computing system (e.g., via one or more wireless networks), from a local memory, from a remote memory, etc.

At (610), the method 600 can include determining a checklist associated with the destination location. For instance, the computing system (e.g., vehicle computing system 100, etc.) can determine a checklist associated with the destination location based at least in part on the data indicative of the service assignment. The checklist can include a plurality of checklist elements. The computing system can determine each of the checklist elements based at least in part on the destination location. For example, the computing system can parse the data indicative of the service assignment to identify a coordinate, address, semantic name, and/or other identifier associated with the destination location. The computing system can identify the destination location (and/or an associated type) and access a checklist data structure. The computing system can traverse the checklist data structure to identify a parent node associated with the destination location and traverse the child nodes associated therewith to identify the checklist elements to be included in the checklist, as described herein. The computing system can generate the checklist based at least in part on the checklist elements represented in the child nodes. By way of example, the checklist associated with an airport can include a plurality of checklist element. Each of the checklist elements can associated with an item, a task, or a question for a user to consider before travelling to the airport (e.g., a reminder to bring plane tickets, check-in to flight, prompts for airline/flight information, etc.).

At (615), the method 600 can include providing the checklist for display via a display device. For instance, the computing system (e.g., the vehicle computing system, etc.) can provide, for display via a display device, data indicative of a user interface. The user interface can present the checklist associated with the destination location. As described herein, the user interface can be displayed via one or more different display devices. In some implementations, the user interface presenting the checklist can be viewable by a user from an exterior of the autonomous vehicle. The user can interact with the display device from the exterior of the autonomous vehicle. In some implementations, a user device associated with an interior of the autonomous vehicle can include the display device that displays the user interface. For example, the user interface presenting the checklist can be viewable by a user from an interior of the autonomous vehicle (e.g., rendered on a display device of an onboard tablet, etc.). The user can interact with the display device (e.g., an interactive touch screen, etc.) from the interior of the autonomous vehicle.

In some implementations, the computing system can select which display device to utilize for display of the user interface including the checklist. For instance, the computing system can select a display device based at least in part on environmental condition(s) associated with the autonomous vehicle. By way of example, the computing system can obtain data indicative of at least one of a weather condition or a traffic condition. The computing system can select the display device from among a plurality of display devices (e.g., an exterior oriented display device, an interior oriented display, user device associated with the user that includes a display device, etc.) based at least in part on at least one of the weather condition or the traffic condition.

At (620), the method 600 can include obtaining data indicative of user input associated with the checklist. For instance, the computing system (e.g., the vehicle computing system, etc.) can obtain data indicative of user input associated with the checklist. The user input can be associated with address the checklist elements of the checklist. By way of example, the user can provide a touch interaction with the display device to interact with a user interface element to indicate that an item has been addressed (e.g., the user has the needed tickets, etc.) and/or an item should be ignored (e.g., the user's immigration papers are not needed for a flight, etc.). The autonomous vehicle can be prohibited from travelling to the destination location until the checklist has been completed.

At (625), the method 600 can include determining that the checklist has been completed. For instance, the computing system (e.g., the vehicle computing system, etc.) can determine that the checklist has been completed based at least in part on the user input associated with the checklist. For example, the computing system can process the data indicative of the user input to determine that user input has been provided with respect to each of the checklist elements. This can include, for example, each of the checklist elements having been completed and/or ignored by the user. In some implementation, the computing system can verify that a user has in fact addressed the checklist element (e.g., via image data of the user's passport, tickets, etc.). In some implementations, the computing system can obtain data indicating that the user does not desire to address the checklist elements (e.g., by interacting with a SKIP button). In some implementations, the computing system can still treat this as a completion of the checklist for determining when to begin travel to the destination location.

At (630), the method 600 can include causing the autonomous vehicle to initiate a motion control to travel to the destination location. For instance, in response to determining that the checklist has been completed, the computing system (e.g., the vehicle computing system, etc.) can cause the autonomous vehicle to initiate a motion control to travel to the destination location. As described herein, this can include the computing system controlling the autonomous vehicle to begin travel to transport the user to the destination location. In some implementations, this can also include the autonomous vehicle exiting a parking mode and/or a limited geographic area (e.g., a loop around a block, etc.).

The method 600 can be repeated for a subsequent service assignment associated with the autonomous vehicle.

Figure 7:
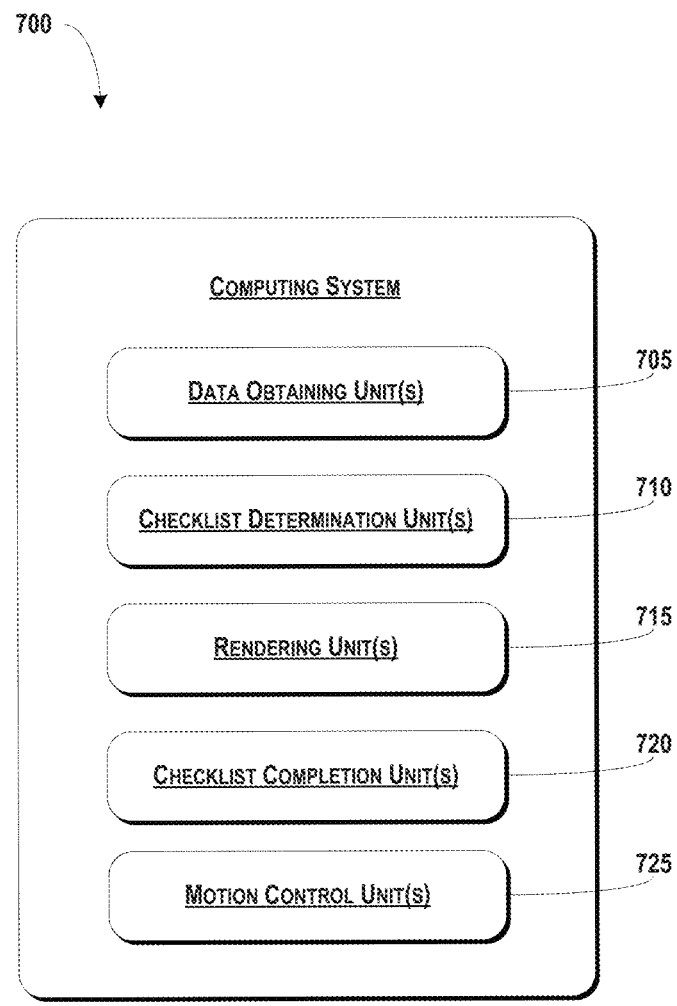
FIG. 7 depicts example system with units for performing operations and functions according to example embodiments of the present disclosure.

Various means can be configured to perform the methods and processes described herein. For example, FIG. 7 depicts a diagram of an example computing system 700 that includes various means according to example embodiments of the present disclosure. The computing system 700 can be and/or otherwise include, for example, the vehicle computing system 100/240, an operations computing system 200, a vehicle provider computing system 250, etc. The computing system 700 can include data obtaining unit(s) 705, checklist determination unit(s) 710, rendering unit(s) 715, checklist completion unit(s) 720, motion control unit(s) 725, and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit (s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 705) can be configured to obtain data indicative of a service assignment associated with an autonomous vehicle (e.g., from an accessible memory, from a remote computing system, etc.). As described herein, the service assignment can be indicative of a destination location for a requested vehicle service and/or other information. The means (e.g., the checklist determination unit(s) 710) can determine a checklist associated with the destination location based at least in part on the data indicative of the service assignment. For example, the means (e.g., the checklist determination unit(s) 710) can parse the service assignment to identify the destination location and traverse a checklist data structure to determine the checklist elements that should be included in a checklist associated with the identified destination location. The means (e.g., the rendering unit(s) 715) can provide, for display via a display device, data indicative of a user interface. The user interface can present the checklist associated with the destination location. The means (e.g., the rendering unit(s) 715) can also be configured to select a display device from among a plurality of display devices, as described herein.

The means (e.g., the checklist completion unit(s) 720) can determine that the checklist has been completed based at least in part on the user input associated with the checklist. For example, the means (e.g., the checklist completion unit(s) 720) can detect that a user has provided user input (e.g., touch input) that addresses each of the checklist elements (e.g., by interacting with a corresponding user interface element). The means can cause the autonomous vehicle to initiate a motion control to travel to the destination location in response to determining that the checklist has been completed. The motion control unit(s) 725 are one example of means for initiating a motion control. The motion control unit can include, for example, one or more aspects of the vehicle's autonomy system, vehicle controller, vehicle control systems, etc.

These described functions of the means are provided as examples and are not meant to be limiting. The means can be configured for performing any of the operations and functions described herein.

Figure 8:
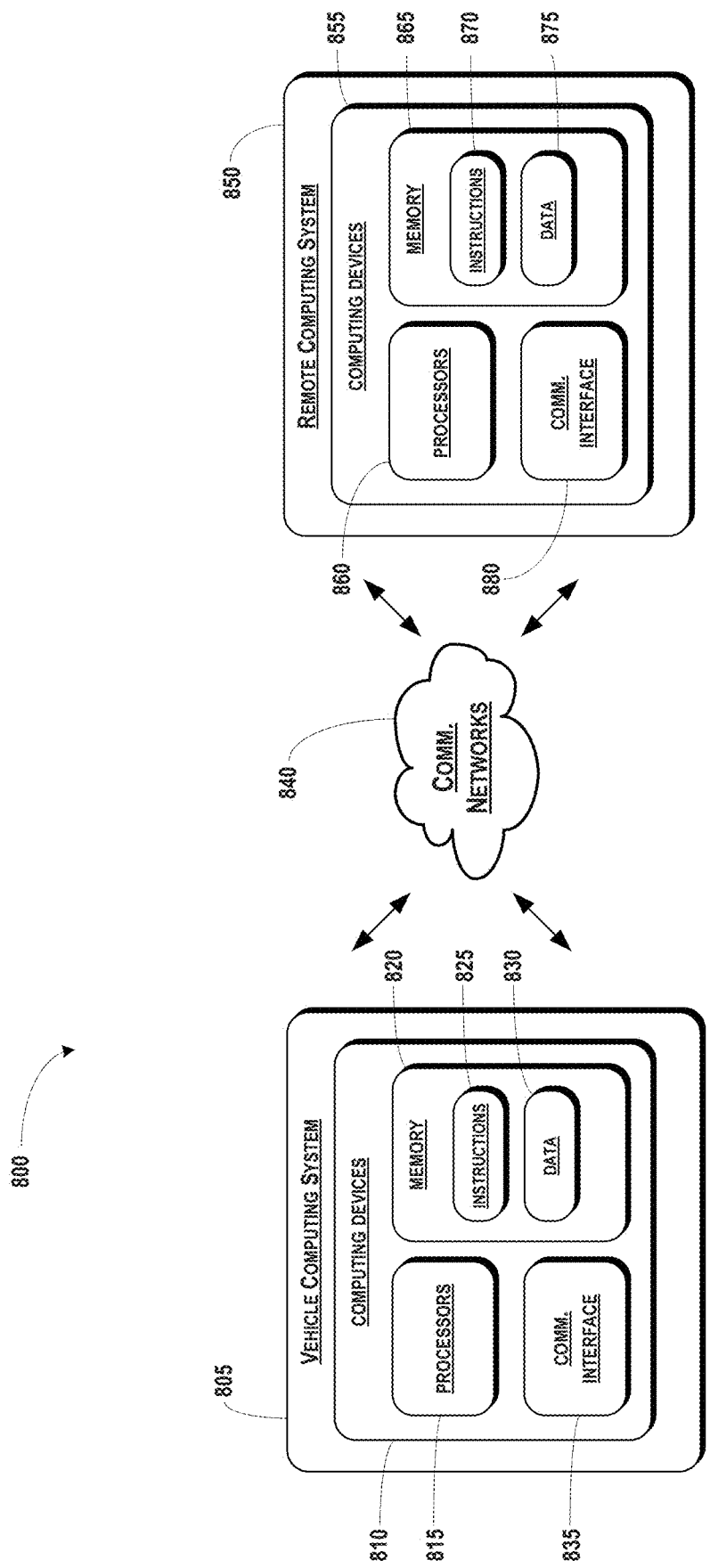
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems 100, 240 described herein. The example system 800 can include a remote computing system 850 (e.g., that is remote from the vehicle computing system). The remote computing system 850 can represent/correspond to an operations computing system 200 described herein, a vehicle provider computing systems 250 described herein, etc. The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the vehicle provider computing systems (or for which it is configured), one or more of the operations and functions of the operations computing systems described herein (or for which it is configured), one or more of the operations and functions for determining a checklist and controlling an autonomous vehicle, one or more portions of method 600, and/or one or more of the other operations and functions of the computing systems described herein.

The memory 820 can store data 830 that can be obtained (e.g., acquired, received, retrieved, accessed, created, stored, etc.). The data 830 can include, for instance, sensor data, map data, vehicle state data, perception data, prediction data, motion planning data, data associated with a vehicle client, data associated with a service entity's telecommunications network, data associated with an API, data associated with a library, data associated with library parameters, data associated with service assignments, data associated with origin locations, data associated with destination locations, data associated with limited geographic areas, data associated with sub-locations, data associated with item(s) (e.g., image data, etc.), data associated with acceptances and/or rejections of service assignments, data associated with checklists and checklist elements, checklist data structures, data associated with user interfaces, data associated with user input, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems 200 described herein, any operations and functions of the vehicle provider computing systems, any of the operations and functions for which the operations computing systems and/or the vehicle computing systems are configured, one or more of the operations and functions of the vehicle computing system 100 described herein, one or more of the operations and functions for determining a checklist and controlling an autonomous vehicle, one or more portions of method 600, and/or one or more of the other operations and functions described herein.

The memory 865 can store data 875 that can be obtained. The data 875 can include, for instance, data associated with service requests, communications associated with/provided by vehicles, data to be communicated to vehicles, application programming interface data, data associated with vehicles and/or vehicle parameters, data associated with checklist(s) and checklist element(s), data associated with service assignments, data associated with acceptances and/or rejections of service assignments, data associated with different service entities, data associated with item(s) (e.g., image data, etc.), data associated with fleet(s) of vehicles, and/or other data/information such as, for example, that described herein.

The computing device(s) 855 can also include a communication interface 880 used to communicate with one or more system(s) onboard a vehicle and/or another computing device that is remote from the system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   obtaining data indicative of a service assignment associated with an autonomous vehicle, wherein the service assignment is indicative of a destination location for a vehicle service;
   determining a checklist associated with the destination location based at least in part on the data indicative of the service assignment, wherein the checklist comprises a plurality of checklist elements that are respectively determined based at least in part on a checklist data structure configured to analyze data indicative of the destination location, wherein the checklist data structure comprises one of a hierarchy or a data tree, the data tree comprising a plurality of nodes that include a plurality of parent nodes respectively indicative of a type of possible destination location; and
   providing, for display via a display device, data indicative of a user interface, wherein the user interface presents the checklist associated with the destination location;
   obtaining data indicative of user input associated with the checklist;
   determining that the checklist has been completed based at least in part on the user input associated with the checklist; and
   in response to determining that the checklist has been completed, causing the autonomous vehicle to initiate a motion control to travel to the destination location.

2. The computer-implemented method of claim 1, wherein the autonomous vehicle is prohibited from travelling to the destination location until the checklist has been completed.

3. The computer-implemented method of claim 1, wherein the destination location comprises an airport.

4. The computer-implemented method of claim 3, wherein the-plurality of checklist elements are respectively associated with an item, a task, or a question for a user to consider before travelling to the airport.

5. The computer-implemented method of claim 1, wherein the user interface presenting the checklist is viewable by a user from an exterior of the autonomous vehicle and wherein the user interacts with the display device from the exterior of the autonomous vehicle.

6. The computer-implemented method of claim 1, wherein determining the checklist associated with the destination location based at least in part on the data indicative of the service assignment comprises:
   determining each of the checklist elements based at least in part on the destination location.

7. The computer-implemented method of claim 1, wherein providing for display, via the display device, the data indicative of the user interface comprises:
   obtaining data indicative of at least one of a weather condition or a traffic condition; and selecting the display device from among a plurality of display devices based at least in part on at least one of the weather condition or the traffic condition.

8. The computer-implemented method of claim 1, wherein:
determining the checklist associated with the destination location based at least in part on the data indicative of the service assignment comprises traversing the checklist data structure to determine a parent node of the plurality of parent nodes that is indicative of the destination location.

9. The computer-implemented method of claim 1, wherein:
the parent node of the plurality of parent nodes that is indicative of the destination location is associated with a plurality of child nodes respectively indicative of a checklist element of the plurality of checklist elements; and
determining the checklist associated with the destination location based at least in part on the data indicative of the service assignment comprises traversing the plurality of child nodes to determine the checklist elements to include in the checklist.

10. A computing system comprising:
one or more processors; and
one or more tangible, non-transitory, computer readable media that store instructions that are executable by the one or more processors to cause the computing system to perform operations comprising:
obtaining data indicative of a destination location associated with a user of an autonomous vehicle;
determining a checklist for the user based at least in part on the destination location, wherein the checklist comprises a plurality of checklist elements that are respectively determined based at least in part on a checklist data structure configured to analyze data indicative of the destination location, wherein the checklist data structure comprises one of a hierarchy or a data tree, the data tree comprising a plurality of nodes that include a plurality of parent nodes respectively indicative of a type of possible destination location;
providing, for display via a display device, data indicative of a user interface, wherein the user interface presents the checklist;
obtaining data indicative of user input associated with the checklist;
determining that the checklist has been completed based at least in part on the user input associated with the checklist; and
in response to determining that the checklist has been completed, causing the autonomous vehicle to initiate a motion control to travel to the destination location.

11. The computing system of claim 10, wherein the autonomous vehicle remains in a parked position until the checklist has been completed.

12. The computing system of claim 10, wherein the autonomous vehicle is prohibited from travelling outside a limited geographic area until the checklist has been completed.

13. The computing system of claim 10, wherein obtaining the data indicative of the user input associated with the checklist comprises:
obtaining data indicative of user input associated with the plurality of checklist elements, wherein the user input indicates that the user has addressed the checklist elements.

14. The computing system of claim 10, wherein causing the autonomous vehicle to initiate the motion control to travel to the destination location comprises:
determining a sub-location associated with the destination location based at least in part on the user input associated with at least one of the plurality of checklist elements.

15. The computing system of claim 10, wherein the user interface presenting the checklist is viewable by the user from an exterior of the autonomous vehicle and wherein the user interacts with the display device from the exterior of the autonomous vehicle.

16. The computing system of claim 10, wherein the destination location comprises an airport.

17. The computing system of claim 16, wherein at least a portion of the plurality of checklist elements are indicative of items for the user to consider when travelling to the airport.

18. An autonomous vehicle comprising:
one or more processors; and
one or more tangible, non-transitory, computer readable media that store instructions that are executable by the one or more processors to cause the one or more processors to perform operations comprising:
obtaining data indicative of a service assignment, wherein the service assignment is indicative of a destination location;
determining a checklist associated with the destination location based at least in part on the data indicative of the service assignment, wherein the checklist comprises a plurality of checklist elements that are respectively determined based at least in part on a checklist data structure configured to analyze data indicative of the destination location, wherein the checklist data structure comprises one of a hierarchy or a data tree, the data tree comprising a plurality of nodes that include a plurality of parent nodes respectively indicative of a type of possible destination location;
providing, for display via a user interface on a display device, data indicative of the checklist associated with the destination location;
determining that the checklist has been completed based at least in part on user input associated with the checklist; and
in response to determining that the checklist has been completed, causing the autonomous vehicle to initiate a motion control to travel to the destination location.

19. The autonomous vehicle of claim 18, wherein the autonomous vehicle is prohibited from travelling to the destination location until the checklist has been completed.

20. The autonomous vehicle of claim 18, wherein determining that the checklist has been completed based at least in part on the user input associated with the checklist comprises:
obtaining data associated with an image of one or more items associated with the user; and
verifying that at least one checklist element of the checklist has been completed based at least in part on the data associated with the image of the one or more items associated with the user.

* * * * *